US010112695B2

(12) United States Patent
Scimone et al.

(10) Patent No.: US 10,112,695 B2
(45) Date of Patent: Oct. 30, 2018

(54) RECEPTACLE, PAYLOAD ASSEMBLY AND RELATED METHODS FOR AN AIRCRAFT

(71) Applicant: Georgian Aerospace, LLC, Chesterfield, MO (US)

(72) Inventors: Michael J. Scimone, Ballwin, MO (US); Richard Vollmar, O'Fallon, MO (US); Joel Simansky, Alton, IL (US); Jason Henke, Wentzville, MO (US)

(73) Assignee: Georgian Aerospace LLC, Chesterfield, MO (US)

( * ) Notice: Subject to any disclaimer, the term of this patent is extended or adjusted under 35 U.S.C. 154(b) by 71 days.

(21) Appl. No.: 15/241,894

(22) Filed: Aug. 19, 2016

(65) Prior Publication Data

US 2017/0050717 A1    Feb. 23, 2017

Related U.S. Application Data

(60) Provisional application No. 62/207,794, filed on Aug. 20, 2015.

(51) Int. Cl.
*B64C 1/14*    (2006.01)
*B64F 5/00*    (2017.01)

(52) U.S. Cl.
CPC .......... *B64C 1/1407* (2013.01); *B64F 5/0009* (2013.01)

(58) Field of Classification Search
CPC ......... B64C 1/068; B64C 1/14; B64C 1/1407; B64C 1/1415; B64C 1/1461; B64C 1/1484; B64C 1/1492; B64F 5/00; B64F 5/40; B64D 47/00; B64D 47/02; B64D 47/08
See application file for complete search history.

(56) References Cited

U.S. PATENT DOCUMENTS

| | | | | | |
|---|---|---|---|---|---|
| 428,227 | A | * | 5/1890 | Preston | B63B 19/00 114/178 |
| 1,746,518 | A | * | 2/1930 | Brennan | B60J 1/20 49/48 |
| 2,136,289 | A | * | 11/1938 | Edwards | B61D 25/00 49/41 |
| 2,665,459 | A | * | 1/1954 | Lee | B64C 1/14 49/483.1 |

(Continued)

FOREIGN PATENT DOCUMENTS

| FR | 2953464 A1 | 6/2011 |
|---|---|---|
| GB | 142130 A | 1/1921 |

(Continued)

*Primary Examiner* — Richard R Green
*Assistant Examiner* — Michael A. Fabula
(74) *Attorney, Agent, or Firm* — Armstrong Teasdale LLP

(57) ABSTRACT

An aircraft includes a support structure, an outer skin coupled to the support structure, and a port that defines a break in the support structure and extends through the outer skin. The aircraft also includes a receptacle coupled to portions of the support structure proximate the port, such that the receptacle routes at least a portion of the load borne by the support structure around the break defined by the port. The receptacle includes an opening defined therein. The aircraft further includes a removable payload assembly coupled within the receptacle opening, and a pressure ring configured to form a seal between an inner surface of the receptacle and an outer surface of the payload assembly.

20 Claims, 15 Drawing Sheets

(56) References Cited

U.S. PATENT DOCUMENTS

| | | | | |
|---|---|---|---|---|
| 2,686,343 | A * | 8/1954 | Swanson | B64C 1/14 49/477.1 |
| 2,969,252 | A * | 1/1961 | Gruver | B64C 1/14 220/378 |
| 3,496,925 | A * | 2/1970 | Myers | B64D 1/02 124/61 |
| 3,906,669 | A * | 9/1975 | Vorguitch | B64C 1/1492 244/129.3 |
| 4,541,595 | A | 9/1985 | Fiala et al. | |
| 4,588,147 | A * | 5/1986 | Lindsey, Jr. | B64C 7/00 244/118.1 |
| 5,181,677 | A * | 1/1993 | Kaplan | B64C 1/1438 244/129.4 |
| 5,259,576 | A * | 11/1993 | Howard | B64C 1/1438 244/129.4 |
| 5,271,581 | A * | 12/1993 | Irish | B64C 1/1492 244/129.3 |
| 5,520,358 | A * | 5/1996 | Kahn | B64C 1/14 244/1 R |
| 5,816,307 | A * | 10/1998 | Sanz | B64C 1/1484 160/84.04 |
| 5,927,648 | A * | 7/1999 | Woodland | B64D 7/00 244/118.1 |
| 6,227,491 | B1 * | 5/2001 | Stephan | B64C 1/1492 244/129.3 |
| 6,616,097 | B2 * | 9/2003 | Hilbert | B64C 1/20 244/118.1 |
| 6,786,453 | B2 * | 9/2004 | Jones | B64C 1/1492 244/129.3 |
| 7,494,176 | B1 * | 2/2009 | Duffy | B60J 1/085 296/152 |
| 7,665,855 | B2 * | 2/2010 | Yeh | B23Q 11/08 359/508 |
| 8,015,762 | B2 * | 9/2011 | Krahn | B64C 1/1492 244/129.3 |
| 8,376,277 | B2 * | 2/2013 | Costanza | B64D 7/00 244/1 R |
| 8,544,798 | B2 * | 10/2013 | Eberth | B64C 1/1492 244/129.1 |
| 8,695,923 | B2 | 4/2014 | Eberth et al. | |
| 8,770,083 | B1 * | 7/2014 | Hatfield | B64D 1/02 89/1.51 |
| 8,939,406 | B2 * | 1/2015 | Dopker | B64C 1/069 244/119 |
| 9,617,008 | B2 * | 4/2017 | Goto | B64D 15/20 |
| 9,751,611 | B2 * | 9/2017 | Woodland | B64C 1/1461 |
| 9,771,140 | B2 * | 9/2017 | Arevalo Rodriguez | B64C 1/061 |
| 9,783,282 | B2 * | 10/2017 | Woodland | B64C 1/1407 |
| 2006/0022082 | A1 * | 2/2006 | Murg | B64C 1/1446 244/1 R |
| 2006/0060705 | A1 * | 3/2006 | Stulc | B64C 1/069 244/119 |
| 2006/0102792 | A1 * | 5/2006 | Pitzer | B64D 1/02 244/137.1 |
| 2007/0095984 | A1 * | 5/2007 | Wood | B64C 1/1492 244/129.3 |
| 2007/0181746 | A1 * | 8/2007 | Wood | B64C 1/1492 244/129.3 |
| 2007/0202759 | A1 * | 8/2007 | Bermal | B64C 1/1415 441/42 |
| 2008/0178729 | A1 * | 7/2008 | Travis | B64D 1/02 89/1.51 |
| 2008/0217479 | A1 * | 9/2008 | Wood | B60J 1/006 244/129.3 |
| 2009/0145517 | A1 * | 6/2009 | Cardozo | B64D 37/005 141/370 |
| 2009/0146008 | A1 * | 6/2009 | Thiele | B64C 1/068 244/119 |
| 2010/0206988 | A1 * | 8/2010 | Woodland | B64C 1/1407 244/129.5 |
| 2010/0206992 | A1 * | 8/2010 | Woodland | B64C 1/1461 244/137.1 |
| 2010/0320324 | A1 * | 12/2010 | Dittmar | B64C 1/061 244/129.3 |
| 2011/0017870 | A1 * | 1/2011 | Gallant | B64C 1/061 244/129.3 |
| 2011/0155851 | A1 * | 6/2011 | Morales Soto | B64C 1/1492 244/129.3 |
| 2011/0315822 | A1 * | 12/2011 | Fairchild | B60J 5/062 244/129.5 |
| 2012/0001024 | A1 * | 1/2012 | Cruz Dominguez | B64C 1/064 244/119 |
| 2012/0001025 | A1 * | 1/2012 | Sabadie | B64C 1/066 244/129.3 |
| 2012/0097793 | A1 * | 4/2012 | Fort | B64C 1/1492 244/129.1 |
| 2012/0097794 | A1 * | 4/2012 | Fort | B64C 1/1492 244/129.4 |
| 2012/0177878 | A1 * | 7/2012 | Boulet | B29C 73/14 428/131 |
| 2012/0211602 | A1 * | 8/2012 | Dugerie | B64C 1/1461 244/119 |
| 2013/0062352 | A1 * | 3/2013 | Tachibana | B64C 1/14 220/378 |
| 2013/0180176 | A1 * | 7/2013 | Tachibana | B64C 1/14 49/40 |
| 2014/0077034 | A1 * | 3/2014 | Woodland | B64C 1/1407 244/122 R |
| 2014/0186572 | A1 * | 7/2014 | Arevalo Rodriguez | B64C 1/064 428/99 |
| 2016/0039527 | A1 * | 2/2016 | Goto | B61D 49/00 248/214 |
| 2016/0040782 | A1 * | 2/2016 | Goto | F16J 15/02 244/129.1 |
| 2016/0325816 | A1 * | 11/2016 | Scimone | B64C 1/1407 |
| 2016/0368585 | A1 * | 12/2016 | Farouz-Fouquet | B64C 1/064 |
| 2017/0158333 | A1 * | 6/2017 | Woodland | B64C 1/1407 |
| 2017/0225763 | A1 * | 8/2017 | Scimone | B64C 1/1461 |
| 2017/0334539 | A1 * | 11/2017 | Woodland | B64C 1/1407 |

FOREIGN PATENT DOCUMENTS

| | | |
|---|---|---|
| GB | 2165496 A | 4/1986 |
| GB | 2243346 A | 10/1991 |
| WO | 2014181271 A1 | 11/2014 |

\* cited by examiner

RECEPTACLE, PAYLOAD ASSEMBLY AND RELATED METHODS FOR AN AIRCRAFT

CROSS REFERENCE TO RELATED APPLICATIONS

This application claims priority to U.S. Provisional Application Ser. No. 62/207,794, filed Aug. 20, 2015, the disclosure of which is incorporated by reference in its entirety.

BACKGROUND

At least some known aircraft include payloads or other components configured to be at least partially exposed to an external environment while the aircraft is in flight. For example, but not by way of limitation, the payload may be a camera or other optical imaging device, an atmospheric monitor, a sonobuoy, another suitable sensor, ordinance, a countermeasure, or a collection/dispersion device. At least some such payloads may be installed adjacent a port defined in the aircraft outer skin that provides at least partial access to the external environment. In at least some cases, it may be desirable to retrofit an aircraft to add such a port to enable such a payload capability. However, to accommodate a sufficiently large port, it may be necessary to remove a portion of the load-bearing structural frame of the aircraft, which may reduce the performance capabilities of the aircraft. Additionally or alternatively, in at least some cases, it may be desirable to remove the payload for repair or replacement, or to interchange the payload with a different payload or no payload for particular flight operations. However, removing a payload and reinstalling a repaired or different payload may require additional modifications to the aircraft port and/or other time- and labor-intensive operations, during which time the aircraft must be removed from service.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, an aircraft includes a support structure, an outer skin coupled to the support structure, and an opening that defines a break in the support structure and extends through the outer skin. The aircraft also includes a receptacle connected to portions of the support structure around the opening, such that the receptacle bears at least a portion of the load borne by the support structure around the break defined by the port. The aircraft further includes a removable payload assembly within the receptacle, and a pressure ring configured to form a seal between an inner surface of the receptacle and an outer surface of the payload assembly.

In another aspect, a method of retrofitting an aircraft to accommodate a removable payload assembly is described. The aircraft includes a support structure and an outer skin. The method includes removing a portion of the support structure adjacent a port such that a break in the support structure is defined. The port extends through the outer skin. The method also includes coupling a receptacle to portions of the support structure proximate the port, such that the receptacle routes at least a portion of the load borne by the support structure around the break defined by the port. The receptacle includes an opening defined therein. The method further includes coupling a removable payload assembly within the receptacle opening, and coupling a pressure ring between an inner surface of the receptacle and an outer surface of the payload assembly. The pressure ring is configured to form a seal therebetween.

In another aspect, a method of installing a removable payload assembly in a receptacle of an aircraft is described. The aircraft includes a support structure, an outer skin coupled to the support structure, and a port extending through the outer skin. The receptacle is coupled to portions of the support structure proximate the port. The method includes positioning the payload assembly in a first rotational orientation with respect to an opening defined in the receptacle, such that each of a plurality of flanges of the payload assembly aligns with a corresponding gap defined between a pair of a plurality of flanges of the receptacle. The receptacle flanges extend inwardly from an inner surface that defines the receptacle opening, and the payload assembly flanges extend outward from an outer surface of the payload assembly. The method also includes moving the payload assembly at least partially into the receptacle opening, such that the payload assembly flanges pass through the corresponding gaps, and rotating the payload assembly to a second rotational orientation, such that each receptacle flange is aligned with a corresponding payload assembly flange. The method further includes coupling each receptacle flange to the corresponding payload assembly flange to secure the payload assembly within the receptacle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
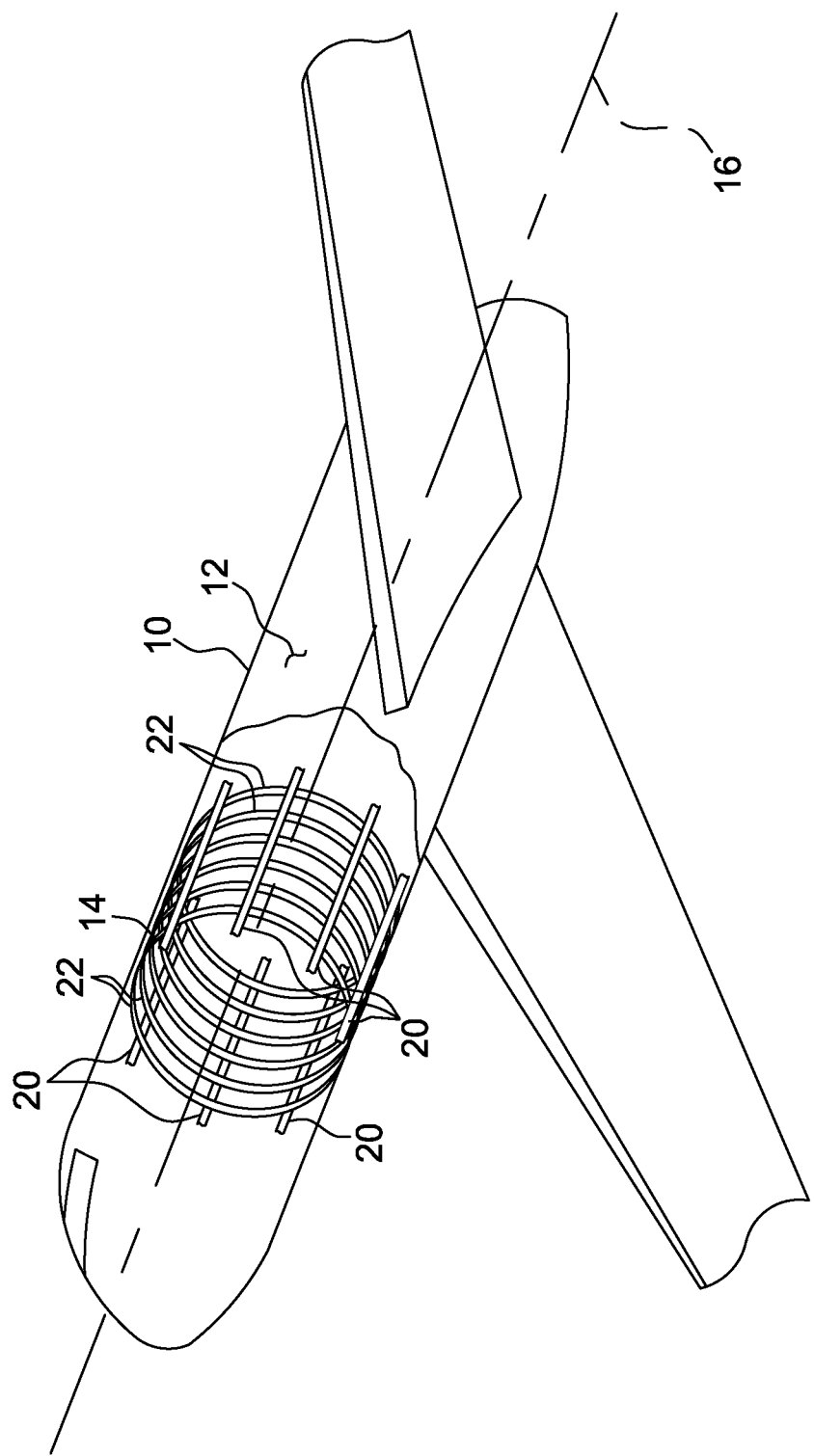
FIG. 1 is a perspective view of an aircraft including an embodiment of a support structure.

FIG. 1 is a perspective view of an aircraft 10 including an embodiment of a support structure 14. The aircraft 10 of this example is a fixed wing aircraft, e.g., a small jet aircraft such as a business jet. The aircraft 10 may alternatively be a propeller driven aircraft, or other type of aircraft including without limitation a rotorcraft, a lighter-than-air aircraft including a dirigible, or any type of remotely piloted or "drone" aircraft. The support structure 14 is configured to provide structural support and stability to the aircraft 10 throughout a range of flight and ground operations of the aircraft 10. An outer skin 12 of the aircraft 10 is coupled to the support structure 14. In some embodiments, at least a portion of an interior of the aircraft 10 is pressurized, and the outer skin 12 defines at least a portion of the pressure boundary between the interior of the aircraft 10 and the external environment.

For example, in the illustrated embodiment, the support structure 14 includes a plurality of longitudinally extending stringers 20 aligned generally parallel to a longitudinal axis 16 of the aircraft 10. It should be understood that the term "stringers" as used in this disclosure includes stringers, longerons, and any other similar type of longitudinally extending structural support member. The support structure 14 also includes a plurality of ribs 22 coupled to the stringers 20. Each rib 22 extends circumferentially in a plane generally normal to the longitudinal axis 16. Although ribs 22 are illustrated as extending in a closed loop about an entire circumference of the aircraft 10, alternatively at least one rib 22 extends over only a portion of the circumference of the aircraft 10. It should be understood that the term "ribs" as used in this disclosure includes ribs, frames, and any other similar type of circumferentially extending structural support member. In alternative embodiments, the support structure 14 includes any suitable structure that enables the support structure 14 to function as described herein.

Figure 2:
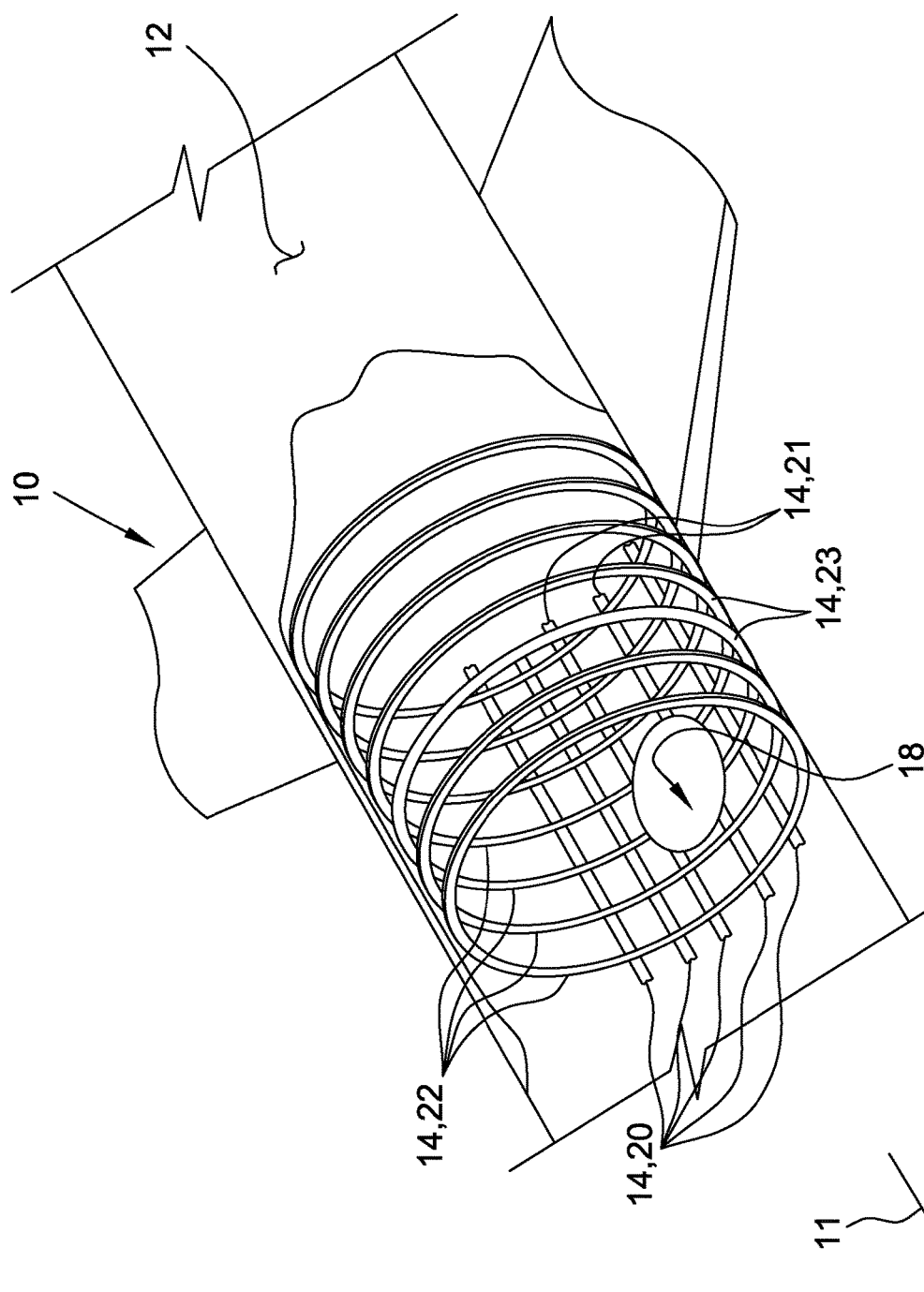
FIG. 2 is another perspective view of the aircraft shown in FIG. 1 having a portion of the support structure removed adjacent an embodiment of a port.

FIG. 2 is another perspective view of the aircraft 10, with a portion of the support structure 14 removed adjacent a port 18. The port 18 is defined in, and extends through, the aircraft outer skin 12. For example, the port is formed in the outer skin in a retrofitting process, or alternatively the outer skin is initially formed with the port defined therein. In the illustrated embodiment, the port 18 also defines a break in the adjacent support structure 14. More specifically, in order for example to accommodate a payload assembly adjacent the port 18, a portion of the support structure 14 overlying the port 18 is removed in a retrofitting process, or alternatively the support structure 14 is initially formed without the overlying portion. In alternative embodiments, the port 18 does not define a break in the support structure 14.

For example, in some embodiments, the port 18 defines a break in at least one stringer 20. More specifically, a portion of the at least one stringer 20 overlying port 18 is removed in a retrofitting process, or alternatively the at least one stringer 20 is initially formed without the overlying portion. Each such at least one stringer 20, designated as a discontinuous stringer 21, includes an aft portion that extends in a forward direction 11 to proximate an aft edge of the port 18, and a forward portion that resumes from a forward edge of the port 18 and extends in the forward direction 11, such that the discontinuous stringer 21 does not extend over the port 18. For example, in the illustrated embodiment, the plurality of stringers 20 includes two discontinuous stringers 21. In alternative embodiments, the plurality of stringers 20 includes any suitable number of discontinuous stringers 21, including zero, that enables the port 18 to function as described herein.

Similarly, in some embodiments, the port 18 defines a break in at least one rib 22. More specifically, a portion of the at least one rib 22 overlying port 18 is removed in a retrofitting process, or alternatively the at least one rib 22 is initially formed without the overlying portion. Each such at least one rib 22, designated as a discontinuous rib 23, includes a first portion that extends in a first lateral direction from a first lateral edge of the port 18, and a second portion that extends in an opposite lateral direction from an opposite lateral edge of the port 18, such that the discontinuous rib 23 does not extend over the port 18. For example, in the illustrated embodiment, the plurality of ribs 22 includes two discontinuous ribs 23. In alternative embodiments, the plurality of ribs 22 includes any suitable number of discontinuous ribs 23, including zero, that enables the port 18 to function as described herein.

Figure 3:
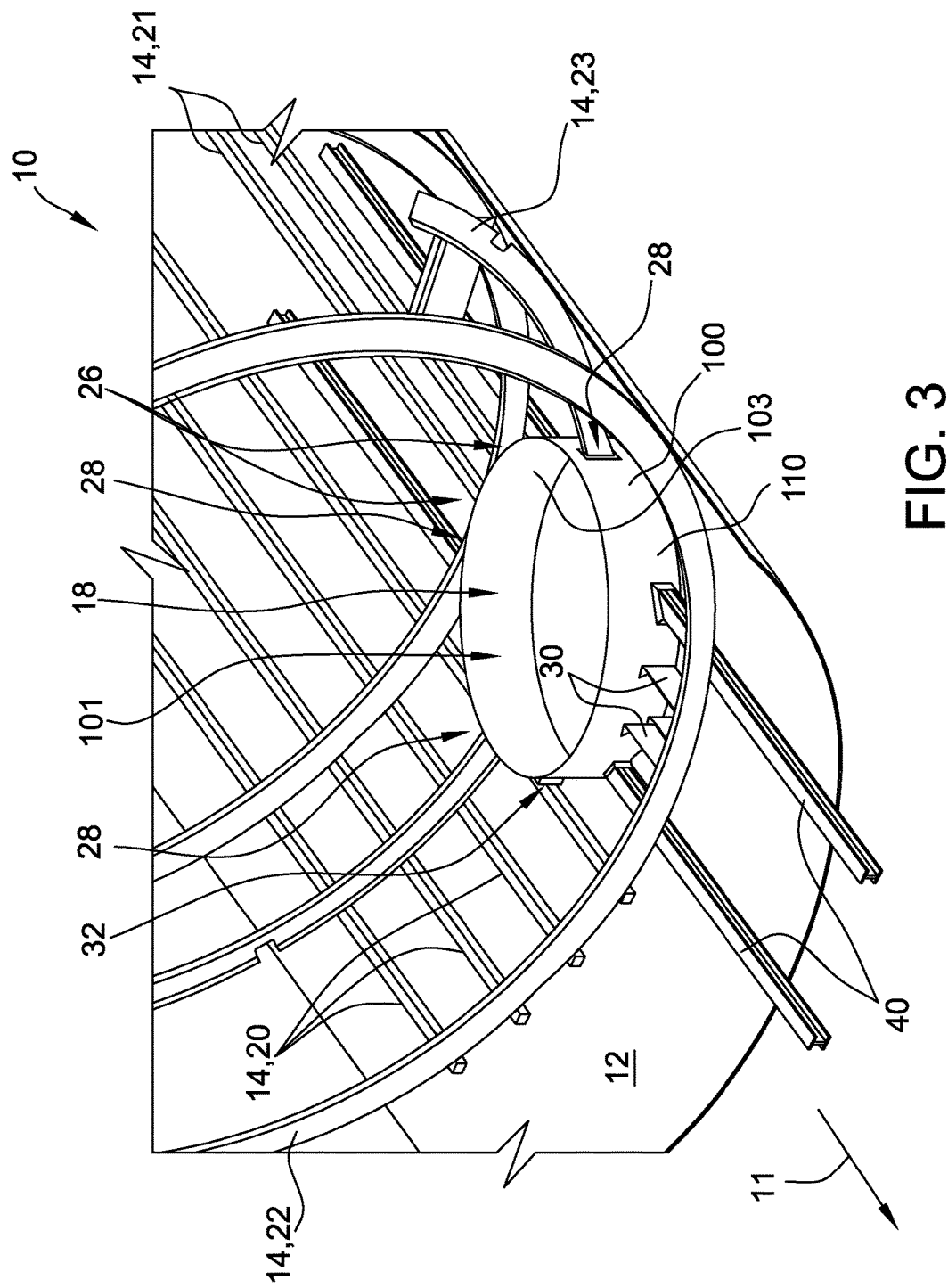
FIG. 3 is another perspective view of the aircraft shown in FIG. 1 having an embodiment of a receptacle installed in the port.

FIG. 3 is another perspective view of the aircraft 10, with an embodiment of a receptacle 100 installed in the port 18. More specifically, the receptacle 100 is installed in the port 18 to facilitate installation and/or removal of a payload assembly adjacent the port 18. The receptacle 100 includes a housing 110 shaped to be received in the port 18. In the illustrated embodiment, the housing 110 is generally annular in shape. In alternative embodiments, the housing 110 is any suitable shape that enables the receptacle 100 to function as described herein.

In some embodiments, the receptacle 100 is load bearing so as to restore at least a portion of the structural strength lost due to discontinuities in the support structure 14, particularly in embodiments in which the aircraft includes a pressurized cabin proximate the port 18. More specifically, the receptacle 100 is coupled to portions of the support structure 14 proximate the port 18, such that the receptacle 100 routes at least a portion of the load borne by the support structure around the break defined by the port. For example, in certain embodiments, the receptacle 100 is coupled to the discontinuous stringers 21 at the free ends 26 of the discontinuous stringers 21 proximate port 18, and/or to the discontinuous ribs 23 at the free ends 28 of the discontinuous ribs 23 proximate port 18. Additionally or alternatively, the receptacle 100 is coupled to at least one continuous stringer 20 and/or at least one continuous rib 22 that extends past the port 18. For example, in the illustrated embodiment, the receptacle 100 is coupled to a continuous rib 22 forward of the receptacle 100 via at least one clip 30, and to a continuous stringer 20 lateral of the receptacle 100 via at least one clip 32. In alternative embodiments, the receptacle 100 is coupled to portions of the support structure 14 proximate the port 18 in any suitable fashion that enables the receptacle 100 to function as described herein. For example, in embodiments in which the receptacle is included in an as-built aircraft, the receptacle 100 may be integrally formed with at one stringer 20 and/or rib 22.

Additionally or alternatively, the receptacle 100 is coupled to at least one additional interior member 40. In some embodiments, the additional interior members 40 are coupled interiorly to the outer skin 12 and/or the pre-existing support structure 14 of the aircraft 10 in a retrofitting process. Alternatively, the aircraft 10 is initially formed to include the additional interior members 40. In some embodiments, the interior members 40 further enable the receptacle 100 to route the load borne by the support structure around the break defined by the port.

In one embodiment, the interior members 40 each extend in the forward direction 11 from the receptacle 100 across at least two ribs 22, and in the opposite, backward direction from the receptacle 100 across at least one rib 22. For example, the interior members 40 span from a continuous rib 22, across the at least one discontinuous rib 23, and to another continuous rib 22. In some embodiments, the span of the interior members 40 across the at least one discontinuous rib 23 at least partially compensates for the load bearing capability that is lost by removing, or by fabricating the support structure 14 without, portions of the at least one discontinuous rib 23. Additionally or alternatively, in some embodiments, the additional interior members 40 provide support for an exterior door assembly 500 (shown in FIG. 17) that is added to the aircraft 10 along with the port 18, as will be described herein. In alternative embodiments, each of the additional interior members 40 extends across any suitable portion of the support structure 14 that enables the additional interior members 40 to function as described herein.

Additionally, in some embodiments, the receptacle housing 110 is formed to enhance a load bearing capacity of the receptacle 100. In the illustrated embodiment, a load bearing capacity of the receptacle 100 is enhanced by integrally forming the receptacle housing 110, such as from a high-strength alloy. For example, the receptacle housing 110 is formed from a unitary block of material in a single machining. Alternatively, the receptacle housing 110 is cast as a single casting. It should be understood that the initial single casting may be machined thereafter. Alternatively, the receptacle housing 110 is integrally formed using an additive manufacturing process, in which a computer numerically controlled (CNC) machine deposits successive thin layers of material to form the receptacle housing 110. Again, it should be understood that the initial additively formed housing 110 may be machined thereafter. In some embodiments, the successive layers of material are deposited using at least one of a direct metal laser melting (DMLM) process, a direct metal laser sintering (DMLS) process, and a selective laser sintering (SLS) process, or another suitable additive manufacturing process. In alternative embodiments, the receptacle housing 110 is formed from any suitable material in any suitable number of subparts, using any suitable manufacturing process, that enables receptacle 100 to function as described herein.

A technical effect of coupling the receptacle 100 to the support structure 14, and/or of forming the receptacle housing 110 unitarily, is that a larger portion of the support structure 14 proximate the port 18 may be removed to accommodate a larger payload assembly without reducing the structural integrity of the aircraft 10. Thus, in some embodiments, for example, a retrofit of the aircraft 10 to add the port and relatively large payload assembly does not limit an operational profile of the aircraft 10.

Figure 4:
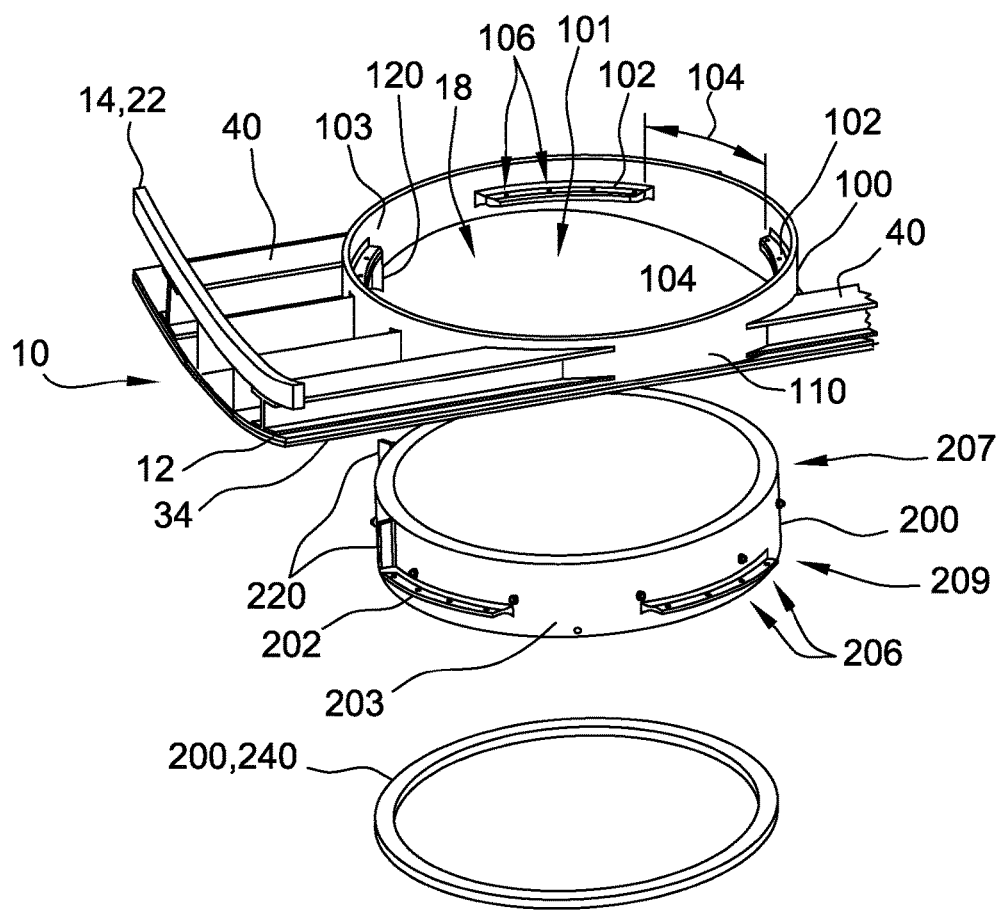
FIG. 4 is a perspective view of an embodiment of a payload assembly aligned for insertion into the receptacle shown in FIG. 3.

FIG. 4 is a perspective view of an embodiment of a payload assembly 200 aligned for insertion into the receptacle 100. The receptacle 100 includes an opening 101 defined therein by an inner surface 103 of the housing 110. In the illustrated embodiment, the opening 101 extends completely through the receptacle 100. In alternative embodiments, the opening 101 extends only partially within the receptacle 100. The opening 101 is configured to receive and secure a removable payload assembly 200 such that the payload assembly 200 at least partially defines a pressure boundary between the interior of the aircraft 10 and the external environment. In the illustrated embodiment, the payload assembly 200 and the opening 101 are each circular, though other shapes are contemplated within the scope of this disclosure.

In the illustrated embodiment, a doubler 34 is attached to the exterior of the outer skin 12 proximate the receptacle 100. The doubler 34 effectively increases a thickness of the outer skin 12 proximate the receptacle 100, and includes an opening congruent with the opening 101 of the receptacle. For example, the doubler 34 is a thin sheet of metal shaped to match a contour of the outer skin 12 proximate the receptacle 100. The doubler 34 is suitably connected to the outer skin 12 to enable the doubler 34 to function as described herein. For example, but not by way of limitation, the doubler 34 is connected to the outer skin 12 using suitable fasteners, such as rivets, bolts or the like. Additionally, in some embodiments, the doubler 34 may be structurally connected or directly attached to the housing 110 of the receptacle 100. Although referred to herein as a "doubler," it should be understood that the doubler 34 is not limited to a thickness that doubles an original thickness of the outer skin 12 proximate the receptacle 100.

In one embodiment, the doubler 34 spans exteriorly from a continuous rib 22, across the at least one discontinuous rib 23 (shown in FIG. 3), and to another continuous rib 22. In some embodiments, the span of the doubler 34 across the at least one discontinuous rib 23 at least partially compensates for the load bearing capability that is lost by removing, or by fabricating support structure 14 without, portions of the at least one discontinuous rib 23. In alternative embodiments, no doubler is used with receptacle 100.

In the illustrated embodiment, the receptacle 100 further includes a plurality of circumferentially spaced flanges 102 extending inwardly from the inner surface 103 of the housing 110 and configured to couple to a corresponding plurality of circumferentially spaced flanges 202 extending outwardly from an outer surface 203 of the payload assembly 200. Also in the illustrated embodiment, each pair of receptacle flanges 102 defines a circumferential gap 104 therebetween. The receptacle flanges 102 and corresponding payload assembly flanges 202 are complementarily sized and spaced such that, in a first rotational orientation of the payload assembly 200 relative to the opening 101 of the receptacle 100, the payload assembly flanges 202 are receivable through the gaps 104, and in a second rotational orientation of the payload assembly 200 relative to the opening 101 of the receptacle 100, the payload assembly flanges 202 are aligned with the receptacle flanges 102.

In this embodiment, at least one receptacle flange 102 includes fastener openings 106 defined therein, and at least one payload assembly flange 202 includes corresponding fastener openings 206 defined therein. More specifically, the respective flange fastener openings 106 and 206 are spaced such that, when the payload assembly 200 is in the second orientation relative to the receptacle 100, each pair of the fastener openings 106 and 206 registers. A fastener (not shown) is receivable by each registered pair of fastener openings 106 and 206 to couple flanges 102 and 202 together, thereby securing the payload assembly 200 to the receptacle 100. For example, the payload assembly flanges may include nut plates (not shown) into which the fasteners are secured. In alternative embodiments, the receptacle 100 and/or the payload assembly 200 each includes any suitable structure that enables the payload assembly 200 to be received by, and secured to, the receptacle 100.

In one example method of installing the payload assembly 200 within the receptacle 100, the payload assembly 200 is positioned below the receptacle opening 101 in the first rotational orientation, such that each payload assembly flange 202 aligns with a corresponding gap 104. For purposes of this disclosure, unless otherwise noted, terms such as "above" and "below" are used solely to describe relative positioning for purposes of explanation, and are not intended to limit the disclosure to an absolute orientation of the components described. The payload assembly 200 is then moved at least partially into the opening 101, such that the payload assembly flanges 202 pass through the corresponding gaps 104 and are elevated above the level of the receptacle flanges 102. The payload assembly 200 is next rotated to the second rotational orientation, such that each receptacle flange 102 is aligned with a corresponding payload assembly flange 202. For example, each receptacle flange 102 is aligned directly above a corresponding payload assembly flange 202. The receptacle flanges 102 and the corresponding payload assembly flanges 202 are then coupled together to secure the payload assembly 200 within the receptacle 100. In alternative embodiments, the payload assembly 200 is installed within the receptacle 100 in any suitable fashion that enables the payload assembly 200 to function as described herein.

In some embodiments, the receptacle flanges 102 and/or the payload assembly flanges 202 are scalloped and/or discontinuous. In some such embodiments, scalloped and/or discontinuous flanges 102 and 202 reduce a weight of the payload assembly 200.

Generally, the receptacle flanges 102 and/or the payload assembly flanges 202 are configured to prevent or inhibit incorrect installation of the payload assembly 200 within the receptacle 100. For example, in some embodiments, the payload assembly 200 is designed to be positioned in a preselected rotational orientation with respect to the receptacle 100, and the receptacle flanges 102 and/or the payload assembly flanges 202 ensure that the payload assembly 200 can only be installed in the preselected orientation. For example, the receptacle flanges 102 and corresponding payload assembly flanges 202 are spaced asymmetrically, such that the payload assembly flanges 202 are only receivable through the receptacle flanges 102 when the payload assembly 200 is in a single orientation. For another example, at least receptacle flange 102 and its corresponding payload assembly flange 202 share a unique pattern of fastener openings or a unique key way, such that the payload assembly flanges 202 are only coupleable to the receptacle flanges 102 when the payload assembly 200 is in the preselected orientation.

Figure 5:
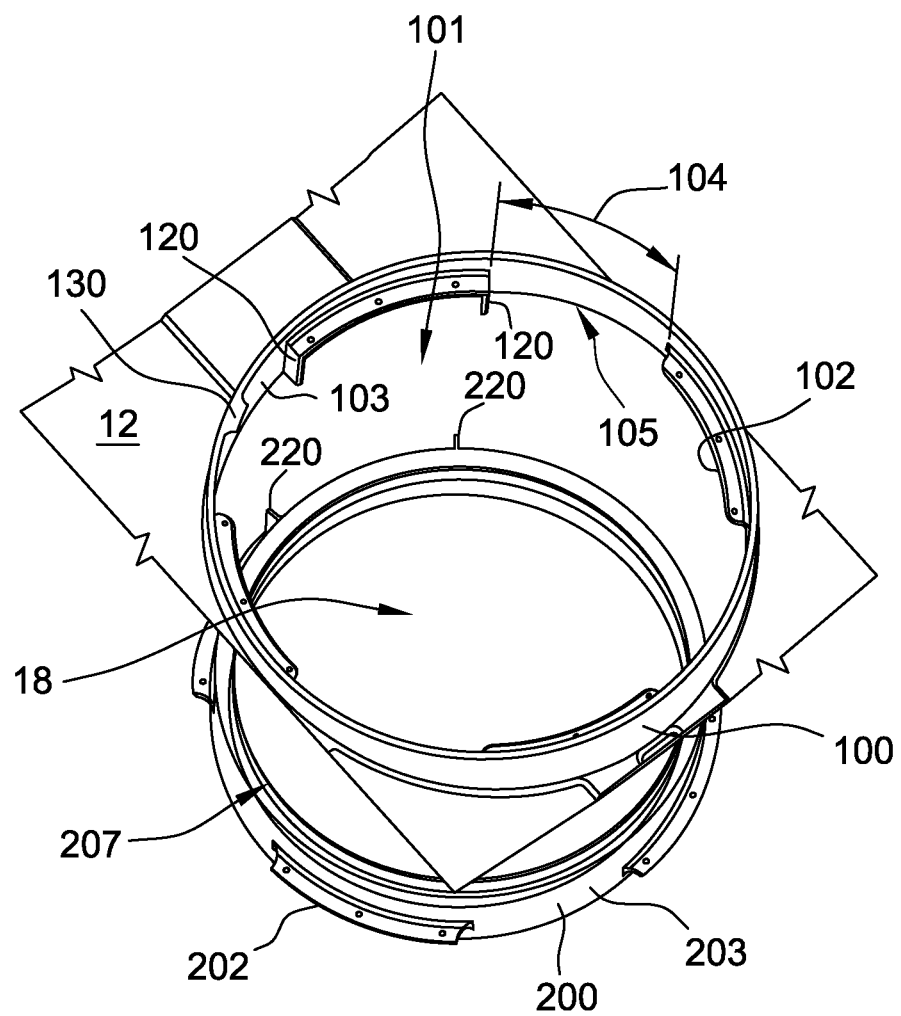
FIG. 5 is another perspective view of the payload assembly shown in FIG. 4 aligned for insertion into the receptacle shown in FIG. 3.

FIG. 5 is another perspective view of the payload assembly 200 aligned for insertion into the receptacle 100. Referring to FIGS. 4 and 5, in some embodiments, the receptacle 100 includes at least one guide 120 and/or the payload assembly 200 includes at least one guide 220. Guides 120 and 220 are configured to facilitate aligning the payload assembly flanges 202 for insertion through the gaps 104 between the receptacle flanges 102. In the illustrated embodiment, the receptacle 100 includes two guides 120, and the payload assembly 200 includes two guides 220. In alternative embodiments, the receptacle 100 and payload assembly 200 each include any suitable number of guides 120 and 220, respectively.

Similar to the receptacle flanges 102, each receptacle guide 120 extends inwardly from the inner surface 103 of the receptacle 100, and each payload assembly guide 220 extends outwardly from the outer surface 203 of the payload assembly 200. However, each guide 120 and 220 extends generally perpendicular to the receptacle flanges 102 and payload assembly flanges 202, that is, generally parallel to a direction of insertion of the payload assembly 200 into the opening 101. In the illustrated embodiment, each receptacle guide 120 extends from an end of a receptacle flange 102 towards a bottom end 105 of the receptacle 100, while each payload assembly guide 220 extends from an end of a payload assembly flange 102 towards a top end 207 of the payload assembly 200. In alternative embodiments, each guide 120 and 220 extends over any suitable extent that enables guides 120 and 220 to function as described herein.

Each guide 120 and 220 is positioned such that, when the payload assembly 200 is aligned for insertion into the opening 101, the guide 120 or 220 interferes with at least one of a corresponding guide 220 or 120, a receptacle flange 102, or a payload assembly flange 202 to prevent the payload assembly 200 from rotating relative to the receptacle 100 as the payload assembly 200 is inserted into the opening 101. Once the payload assembly flanges 202 have passed above the receptacle flanges 102, the guides 120 and/or 220 no longer interfere, such that the payload assembly 200 can be rotated relative to the receptacle 100 to align the flanges 102 and 202 for coupling. In some embodiments, the guides 120 and/or 220 also provide a visual alignment guide for installation of the payload assembly 200 into the receptacle 100. In alternative embodiments, the receptacle 100 and the payload assembly 200 do not include any guides 120 and 220, respectively.

As described above, in certain embodiments, the spacing, sizing, and/or gap size of the receptacle flanges 102 and/or the payload assembly flanges 202 are such that the payload assembly 200 can only be inserted into the receptacle 100 in a single orientation. Similarly, in some embodiments, the guides 120 and/or 220 may be spaced such that the payload assembly 200 can only be inserted within the receptacle 100 in a single orientation.

Figure 6:
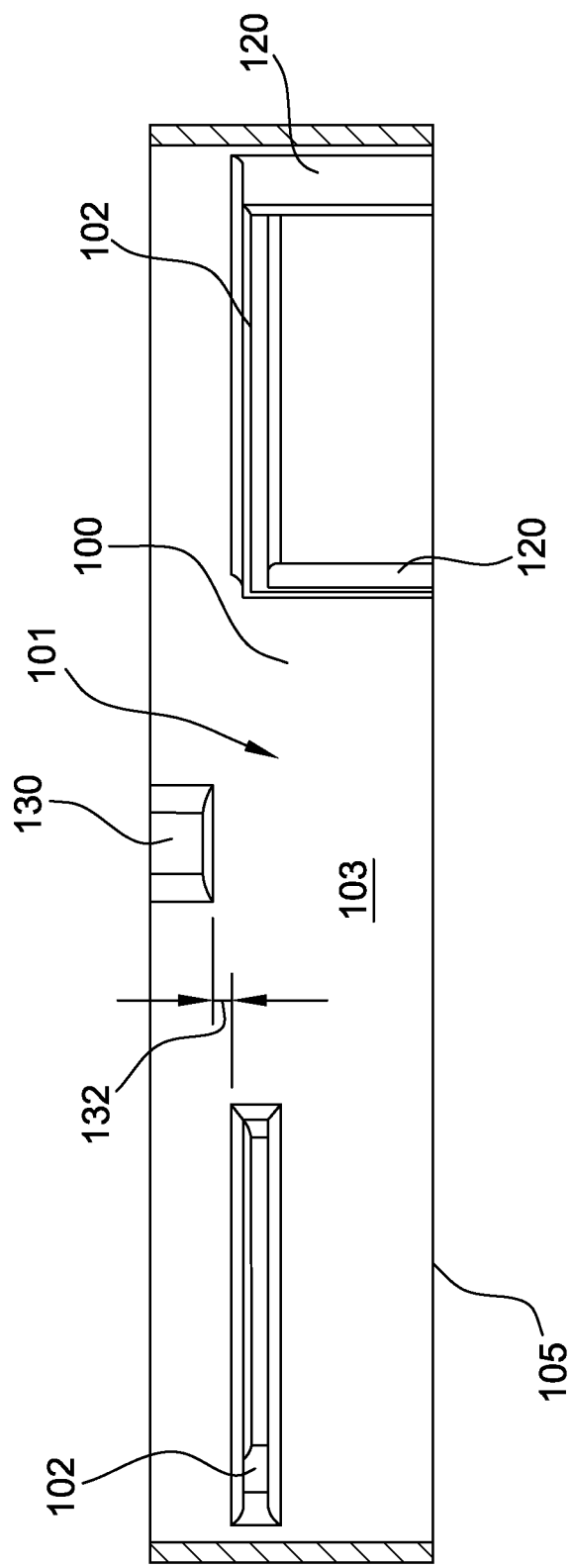
FIG. 6 is a cross-sectional view of the receptacle shown in FIG. 3.

FIG. 6 is a cross-sectional view of the receptacle 100. Referring to FIGS. 4-6, in some embodiments, the receptacle 100 includes at least one mechanical stop 130. In the illustrated embodiment, the mechanical stop 130 is a tab which protrudes inwardly from the inner surface 103 of the receptacle housing 110 and prevents over-insertion of the payload assembly 200 through the opening 101, by interfering with at least one payload assembly flange 202. For example, the mechanical stop 130 prevents the payload assembly 200 from being inserted into the opening 101 to a depth at which the payload assembly 200 contacts another component within the aircraft 10 proximate the port 18, such as an imaging device or other equipment which may be susceptible to damage from contact with the payload assembly 200. The mechanical stop 130 is located at a depth 132 defined beyond the receptacle flanges 102, with respect to the direction of insertion of the payload assembly 200. The depth 132 provides sufficient space for the payload assembly flanges 202 to be elevated vertically between the receptacle flanges 102 and the mechanical stop 130, to enable rotation of the payload assembly 200 into coupling alignment as described above. In alternative embodiments, the receptacle 100 does not include the at least one mechanical stop 130.

In certain embodiments, the at least one mechanical stop 130 also is configured to cooperate with at least one payload assembly guide 220 to prevent installation of the payload assembly 200 at an incorrect orientation by limiting rotation of the payload assembly 200 relative to the receptacle 100. More specifically, after the payload assembly 200 has been inserted into the opening 101 such that the payload assembly flanges 202 have passed through the receptacle flanges 102, rotation into coupling alignment is possible as the flanges and guides of the receptacle and payload assembly no longer interfere, but rotation in, for example, a counterclockwise direction is inhibited by interference between the mechanical stop 130 and one of the payload assembly guides 220, which extends beyond payload assembly flanges 202 to a depth of the mechanical stop 130. In other words, the installer is able to rotate the payload assembly in a first direction, for example clockwise, until the payload assembly flanges 202 align with the receptacle flanges 102, but is prevented from rotating the payload assembly 200 opposite the first direction by interference between the mechanical stop 130 and one of the payload assembly guides 220.

Moreover, in such embodiments, the receptacle 100 also includes a second mechanical stop 130 (not illustrated) configured to similarly interfere with a second payload assembly guide 220 to prevent over-rotation of the payload assembly in the first direction, such that the payload assembly 200 can be rotated in the first direction until the payload assembly 200 reaches the preselected orientation, but no further. Alternatively, the receptacle 100 includes only a single mechanical stop 130 as illustrated, and the payload assembly 200 includes a third guide 220 (not illustrated) located counterclockwise from the two illustrated guides 220, such that when the payload assembly 200 is rotated in the first direction (e.g., clockwise) until the payload assembly flanges 202 and the receptacle flanges 102 align, the third guide 220 contacts the single mechanical stop 130. In other words, interference between the third payload assembly guide 220 and the mechanical stop 130 prevents over-rotation in the clockwise direction. Alternatively, the third guide 220 may be positioned to allow for some over-rotation of the payload assembly 200 in the first direction, but not so much over-rotation that a payload assembly flange 202 can be aligned with a second, incorrect receptacle flange 102.

In alternative embodiments, the receptacle 100 does not include any mechanical stop 130 configured to cooperate with at least one payload assembly guide 220.

Referring again to FIG. 4, in the illustrated embodiment, the payload assembly 200 also includes a pressure ring 240. The pressure ring 240 is configured to form a seal between the outer surface 203 of the payload assembly 200 and the inner surface 103 of the receptacle housing 110 to at least partially define the pressure boundary between the interior of the aircraft 10 and the external environment. More specifically, in the illustrated embodiment, after the receptacle flanges 102 and payload assembly flanges 202 are aligned for coupling, gaps congruent with gaps 104 extend between the inner surface 103 of the receptacle housing 110 and the outer surface 203 of the payload assembly 200, such that the opening 101 is not fully sealed. The pressure ring 240 is configured to form a seal adjacent these gaps between the inner surface 103 and the outer surface 203, enabling the interior of the aircraft proximate port 18 to maintain pressurization relative to the external environment. Thus, the payload assembly 200 defines a pressure boundary between the interior of the aircraft 10 and the external environment. In alternative embodiments, any other suitable structure is used to enable the payload assembly 200 to define a pressure boundary between the interior of the aircraft 10 and the external environment.

In the illustrated embodiment, the pressure ring 240 is ring-shaped with an inner diameter sized for a clearance fit around a diameter of the outer surface 203 of the payload assembly 200. The pressure ring 240 further has an outer diameter that is sized to be received in a clearance fit within a diameter of the inner surface 103 of the receptacle housing 110. In the illustrated embodiment, the pressure ring 240 is coupled to the payload assembly 200 using the same fasteners (not illustrated) that connect the payload assembly flanges 202 to the receptacle flanges 102. For example, a plurality of bolts may extend through a series of aligned fastener openings in the pressure ring 240, the receptacle flanges 102, and the payload assembly flanges 202. As described above, the payload assembly flanges 202 may include nut plates (not shown) into which the fasteners are secured.

In one embodiment of a method of installation of the payload assembly 200 within the receptacle 100, the payload assembly 200 is aligned in the first rotational orientation with respect to the opening 101 of the receptacle 100, such that the payload assembly flanges 202 may pass through the gaps 104 between the receptacle flanges 102. The payload assembly 200 is inserted into the opening 101 such that the payload assembly flanges 202 are elevated from below to above the receptacle flanges 102. While the payload assembly flanges 202 are elevated above the receptacle flanges 102, the payload assembly 200 is rotated until the payload assembly flanges 202 align directly above the receptacle flanges 102 for coupling. The payload assembly 200 is lowered until the payload assembly 200 is supported from below by the receptacle flanges 102 supporting the payload assembly flanges 202. The pressure ring 240 is then inserted into the opening 101 between the inner surface 103 of the receptacle housing 110 and the outer surface 203 of the payload assembly 200. The pressure ring 240, the payload assembly flanges 202, and the receptacle flanges 102 are secured to one another using fasteners.

Furthermore, in one embodiment of a method of removal of the payload assembly 200 from within the receptacle 100, the steps described above are reversed. In alternative embodiments, installation of the payload assembly 200 within the receptacle 100 and/or removal of the payload assembly 200 from within the receptacle 100 is accomplished in any suitable fashion that enables the payload assembly 200 to function as described herein.

Figure 7:
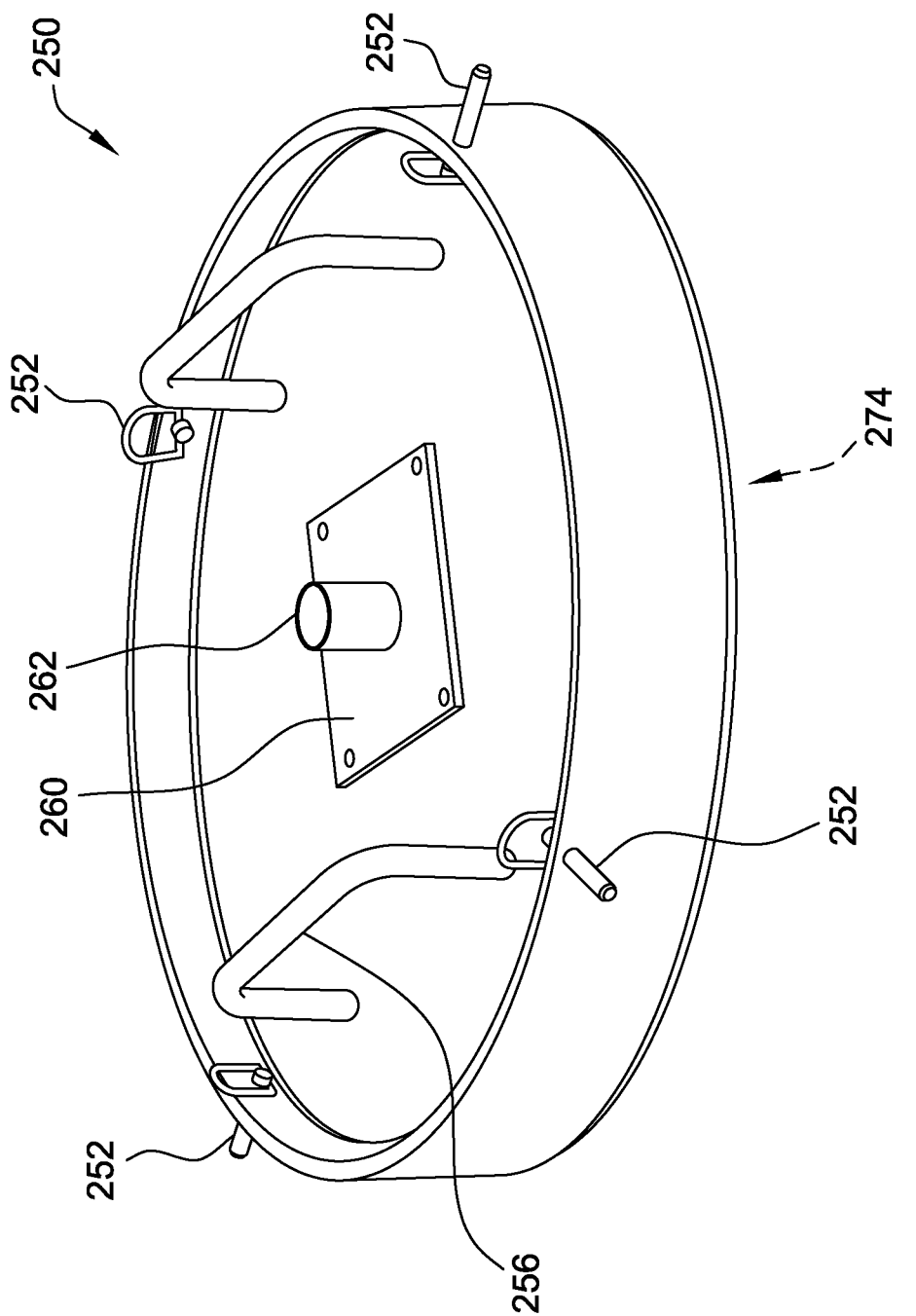
FIG. 7 is a perspective view of an embodiment of an installation tool for use with the payload assembly shown in FIG. 4.
Figure 8:
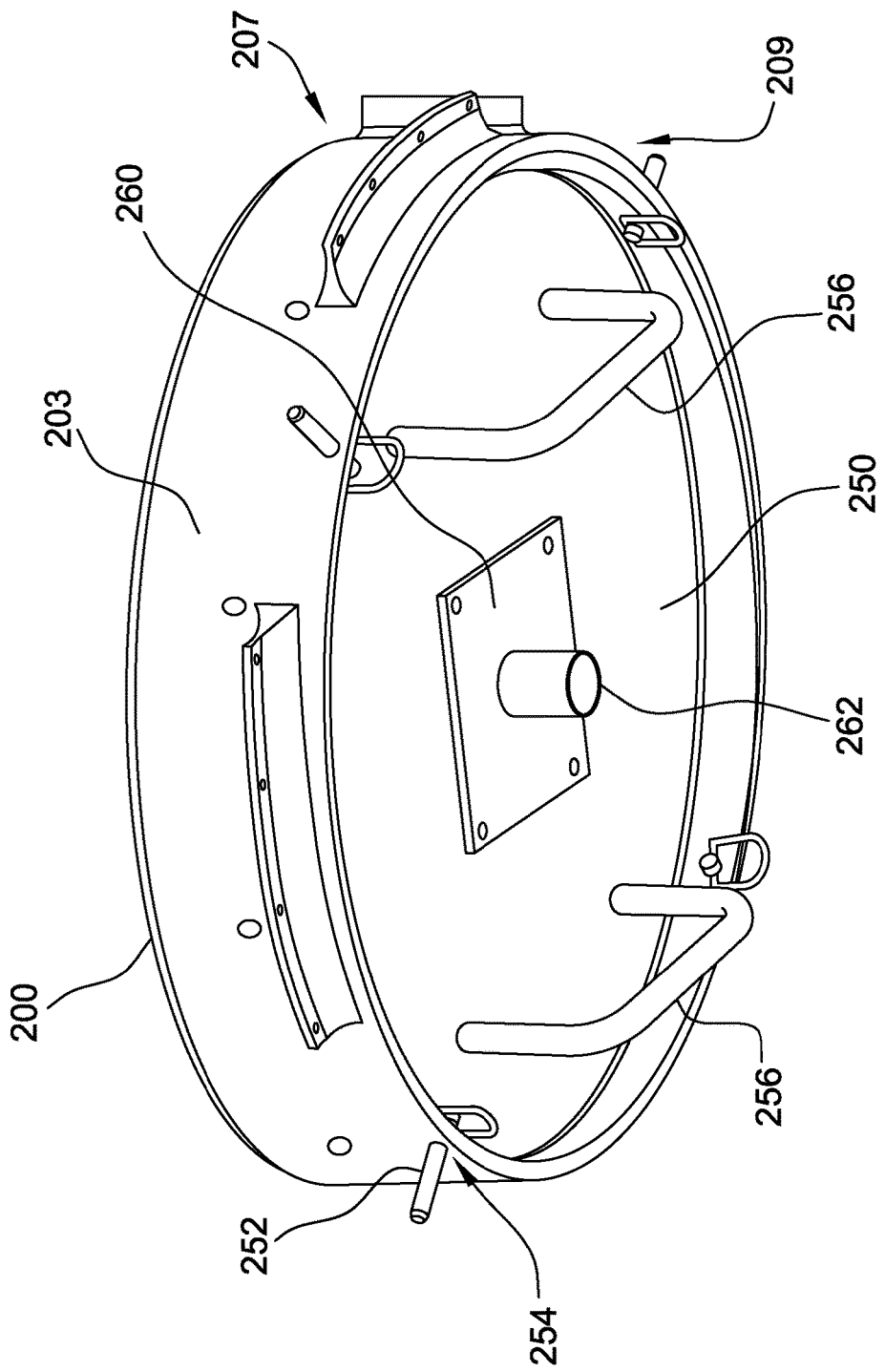
FIG. 8 is a perspective view of the installation tool shown in FIG. 7 coupled to the payload assembly shown in FIG. 4.

FIG. 7 is a perspective view of an embodiment of an installation tool 250 for use with the payload assembly 200. FIG. 8 is a perspective view of the installation tool 250 coupled to the payload assembly 200. Referring to FIGS. 7 and 8, in certain embodiments, the installation tool 250 is configured to couple to the payload assembly 200 to facilitate installation and removal of the payload assembly 200 from the receptacle 100. For example, in the illustrated embodiment, the installation tool 250 is sized for insertion within an annular bottom end 209 of the payload assembly 200 opposite top end 207. A plurality of pins 252 are coupled to a perimeter of the installation tool 250 and are radially extendable with respect thereto. A corresponding plurality of openings 254 are defined along a bottom edge of a perimeter of the payload assembly 200, and each opening 254 is configured to receive a corresponding radially extended pin 252, such that the installation tool 250 is removably coupled to the payload assembly 200. Moreover, in some embodiments, a first surface 274 of the installation tool is configured to couple against a structure (not shown) within the annular bottom end 209 when the pins 252 are aligned with the openings 254. In alternative embodiments, the installation tool 250 is configured to couple to the payload assembly 200 in any suitable fashion that enables the installation tool 250 to function as described herein.

In the illustrated embodiment, the installation tool 250 also includes a pair of handles 256 to facilitate gripping and manipulation of the installation tool 250, and of the payload assembly 200 coupled thereto, by the installer. In alternative embodiments, the installation tool 250 is gripped and/or manipulated in any suitable fashion.

In one embodiment of a method of installation of the payload assembly 200 within the receptacle 100, an installer can insert the payload assembly 200 into the receptacle 100, as described above, using the installation tool 250. More specifically, the installer couples the installation tool 250 to the payload assembly 200, and aligns and pushes the payload assembly 200 upward using the handles 256 of the installation tool 250. The pins 252 inserted through the openings 254 in the payload assembly 200 prevent the installation tool 250 from falling during the installation. The pins 252 also maintain the installation tool stationary relative to the payload assembly 200 as the installation tool 250 is rotated. This allows the installer to rotate the payload assembly 200 using the installation tool 250 to align the payload assembly flanges 202 and the receptacle flanges 102. The payload assembly 200 is lowered until the payload assembly 200 rests on the receptacle flanges 102. As the flanges engage, the gravity load of the payload assembly 200 is taken by the receptacle 100, and the installer can cease supporting the payload assembly 200 with the installation tool 250. The installer can release the handles 256, and the pins 252 will support the installation tool 250. This allows the installer to secure the payload assembly flanges 202 and/or the pressure ring 240 to the receptacle 100 using fasteners while the installation tool 250 is self-supporting. After the payload assembly 200 is secured, the pins 252 can be radially retracted to uncouple the installation tool 250 from the payload assembly 200.

In certain embodiments, the installation tool 250 is used in combination with a jack (e.g., an aircraft jack, not shown) to install and/or remove the payload assembly 200. For example, rather than using the handles 256 alone to install or remove the payload assembly 200 in the receptacle 100, the installation tool 250 is used in combination with the jack. The jack is used to lift the installation tool 250, and the payload assembly 200 coupled thereto, into the opening 101 (or, during removal, out of the opening 101). The handles 256 of the installation tool are used to rotate the payload assembly 200 and align the payload assembly flanges 202 with respect to the receptacle flanges 102 while the jack at least partially lifts and/or supports a weight of the payload assembly 200. In alternative embodiments, the payload assembly 200 is installed and/or removed without use of the jack.

In the illustrated embodiment, the installation tool 250 includes a jack pad 260. The jack pad receives, and pivots around, the jack within a hollow cylinder 262 of the jack pad. For example, the jack pad 260 is connected to the installation tool 250 with suitable fasteners. For another example, the jack pad 260 is temporarily connected to the installation tool 250 using an adhesive. In alternative embodiments, the jack pad 260 is not secured to the installation tool 250, but rather is supported by the jack (not shown) and brought into contact with the installation tool 250 when the jack lifts and/or supports the installation tool 250 and the payload assembly 200.

Figure 9:
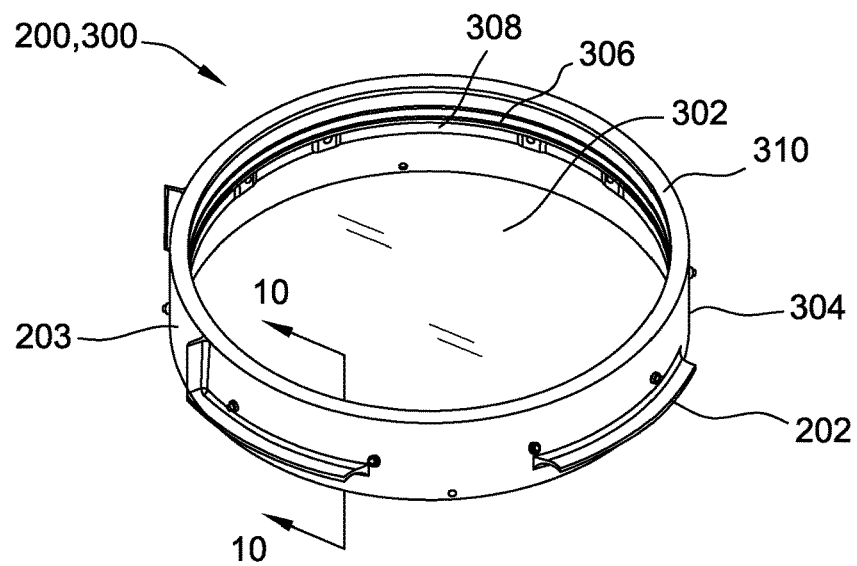
FIG. 9 is a perspective view of the payload assembly of FIG. 4 implemented as an embodiment of a window assembly.

FIG. 9 is a perspective view of the payload assembly 200 implemented as an embodiment of a window assembly 300. In the window assembly implantation, the payload assembly 200 includes a window 302 that is at least partially transparent to electromagnetic radiation in at least one bandwidth, such as an optical bandwidth, an infrared bandwidth, or another suitable bandwidth within the electromagnetic spectrum. For example, the payload includes an imaging device 330 (shown in FIG. 13), for example at least one of a camera, a human observer, an illumination device, and another suitable sensor, positioned in an interior of the aircraft 10 above the receptacle 100 to see through the window 302, such that the imaging device has a line of sight to an area to be imaged.

Figure 10:
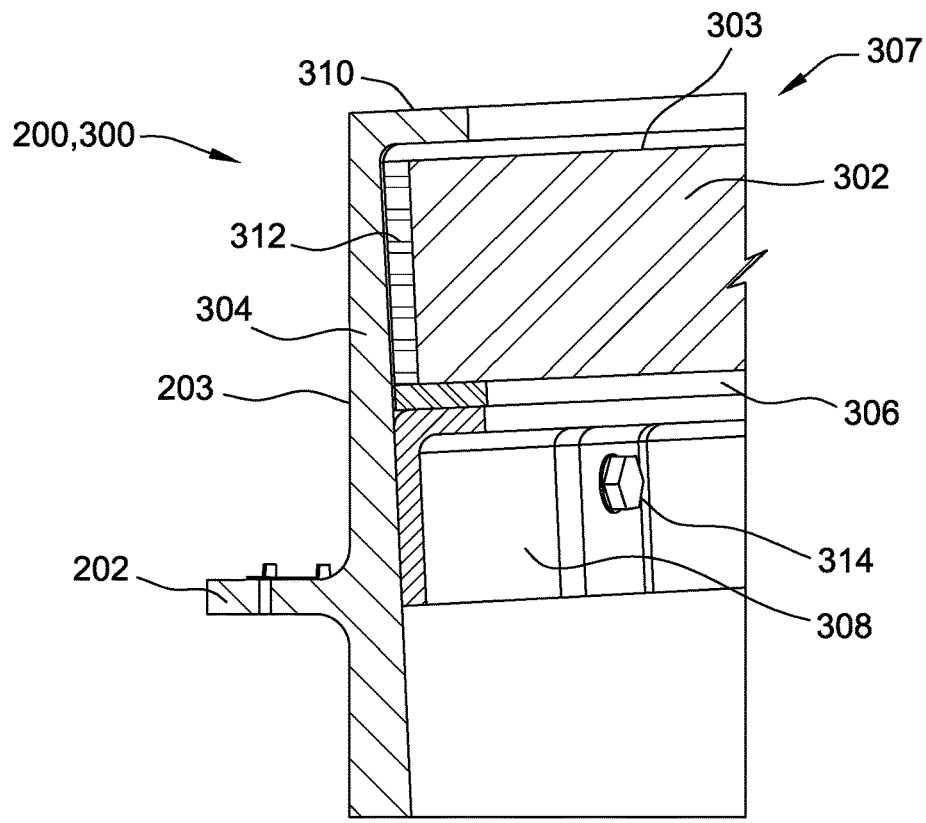
FIG. 10 is a cross-sectional view of the window assembly shown in FIG. 9, taken along lines 10-10 shown in FIG. 9.
Figure 11:
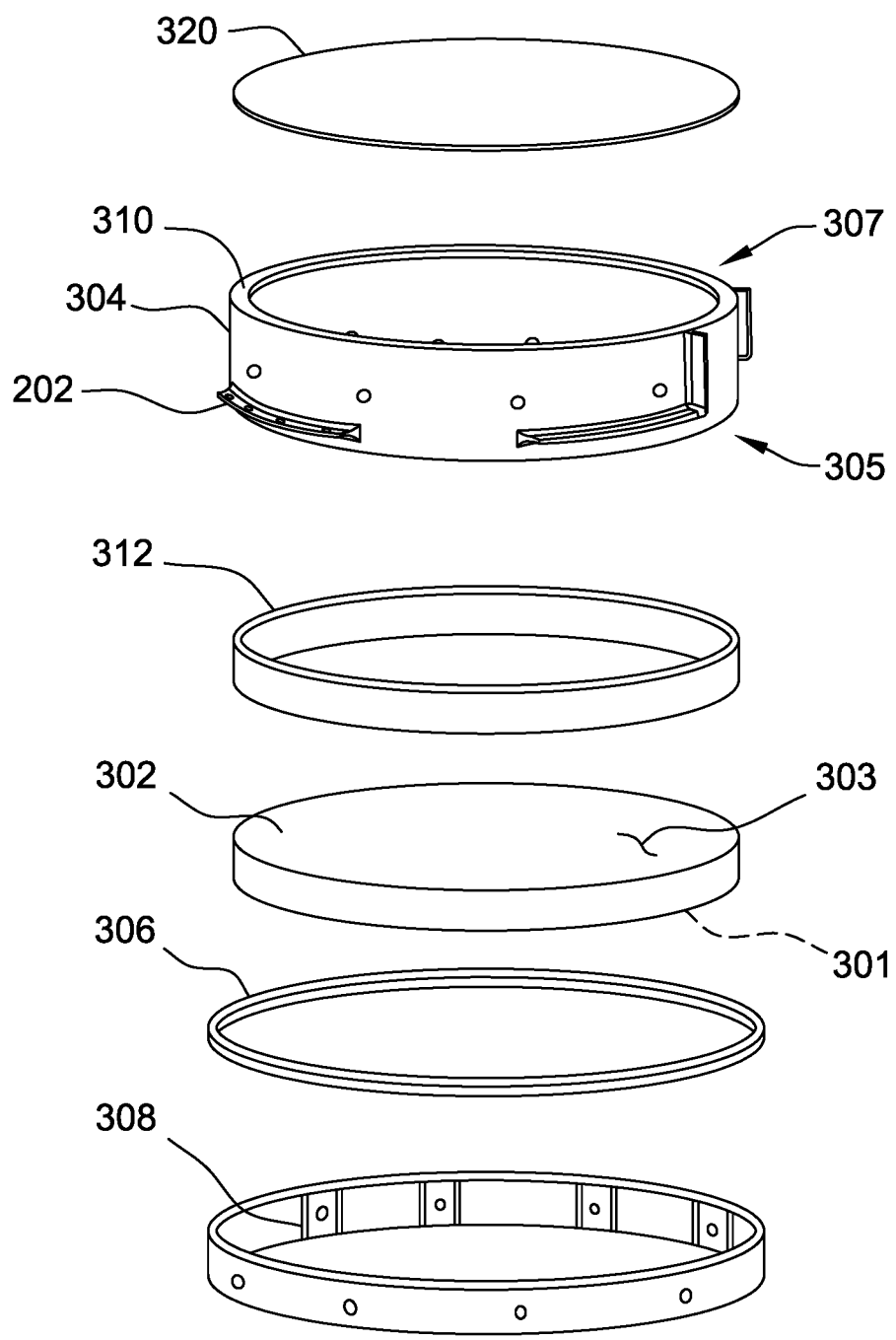
FIG. 11 is an exploded view of the window assembly shown in FIG. 9.

FIG. 10 is a cross-sectional view of the window assembly 300 taken along lines 10-10 shown in FIG. 9. FIG. 11 is an exploded view of the window assembly 300. With reference to FIGS. 9-11, in the illustrated embodiment, the window assembly 300 further includes a housing 304, a gasket 306, and a retainer ring 308. The outer surface 203 is defined on the housing 304, and the receptacle flanges 202 again extend outwardly from the outer surface 203, as described above. The housing 304 also supports and contains the other components of the window assembly 300. In one embodiment, the housing 304 is formed by at least machining. In alternative embodiments, the housing 304 is formed using other suitable techniques such as casting, molding, forging, or other techniques.

In the illustrated embodiment, the window 302 is formed from glass and is circular. In alternative embodiments, the window 302 is formed from any suitable material, for example acrylic or polycarbonate, and has any suitable shape that enables the window assembly 300 to function as described herein. In the illustrated embodiment, the window 302 is sized to be received through an opening defined by a first end 305 of the housing 304. An inwardly extending lip 310 at a second end 307 of the housing 304, opposite the first end 305, is configured to bear against an edge of a second face 303 of the window 302 to retain the window 302 in place proximate the second end 307.

The gasket 306 and the retainer ring 308 also are each sized to be received through the opening defined by the first end 305 of the housing 304. The retainer ring 308 is configured to bear against an edge of a first face 301 of the window 302, opposite the second face 303, to secure the window 302 within the housing 304. For example, the window 302 is inserted through the housing first end 305 and positioned against the lip 310, the gasket 306 is inserted through the housing first end 305 and positioned against the edge of the first face 301 of the window to facilitate forming a pressure seal around the edges of the window 302, and the retainer ring 308 is inserted through the housing first end 305 and secured to the housing using fasteners 314 or another suitable technique. The housing 304 may further include nut plates or other suitable features for receiving fasteners. In alternative embodiments, the window assembly 300 includes any suitable structure to secure the window 302 within the housing 304.

To further facilitate forming a seal (e.g., to maintain pressure within the aircraft) and/or to protect the window 302 from damage, the window 302 may be sealed into the housing with a sealant 312, for example an RTV silicone sealant. In alternative embodiments, the window 302 is sealed in any suitable fashion.

The window 302 may be protected with a cover 320. For example, the cover 320 connects to the housing 304. The cover 320 may be a fabric, a plastic, or other suitable material to prevent damage to the glass or other material used to form the window 302. In one embodiment, the cover 320 is removably connected to the housing 304 using a fastener. For example, the fastener may be a fabric hook and loop fastener, hook and pile fastener, touch fastener, or the like. One fabric strip or a series of fabric strips is attached to the housing, for example, using an adhesive. A second fabric strip or series of fabric strips is attached to or incorporated in the cover 320. One of the two fabric strips includes a plurality of hooks with the other strip including a plurality of loops (not shown), such that bringing the two fabric strips into contact removably connects the cover 320 to the housing 304. In alternative embodiments, any suitable fasteners are used to removably connect the cover 320 to the window assembly 300. For example, the cover 320 may include female portions of snap fasteners and the housing may include corresponding male portions of snap fasteners (not shown).

In the illustrated embodiment, the housing first end 305 extends beyond the retainer ring 308. This allows for the installation tool 250 (shown in FIG. 7) to be inserted through the housing first end 305 to facilitate installation of the window assembly 300 within the receptacle 100 (shown in FIG. 4). In alternative embodiments, the housing first end 305 does not extend beyond the retainer ring 308.

Figure 12:
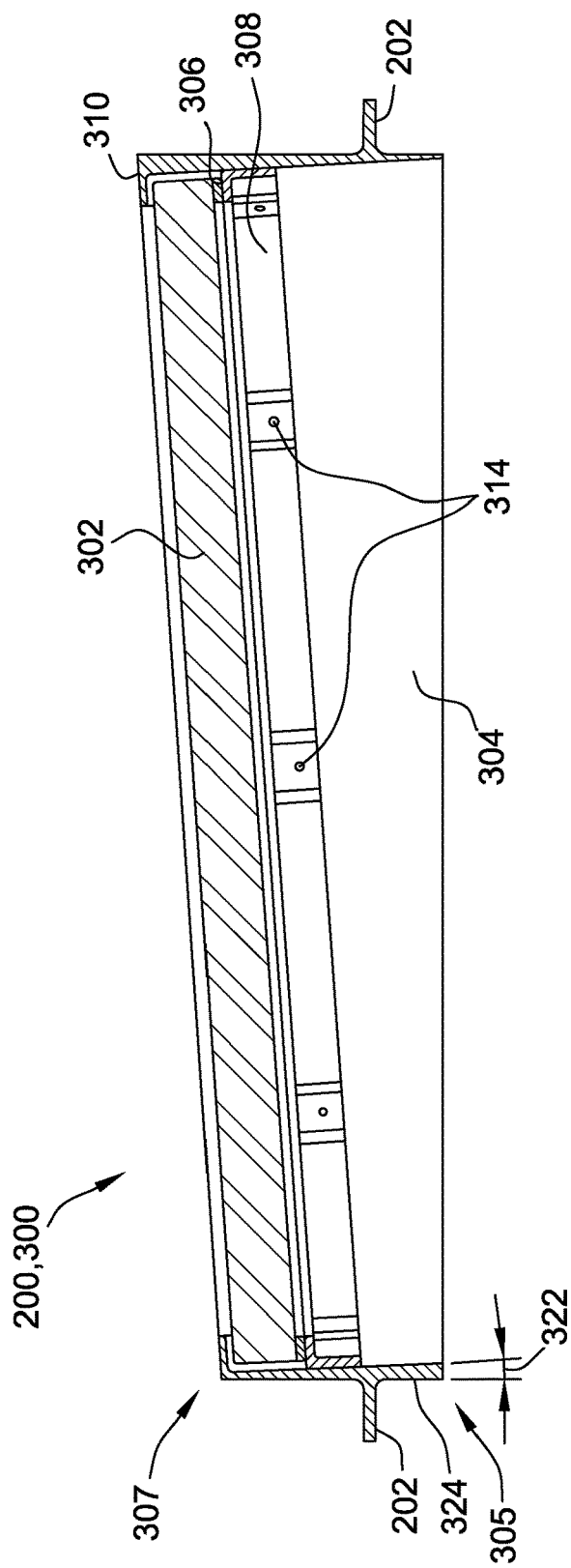
FIG. 12 is another cross-sectional view of the window assembly shown in FIG. 9, taken across a full diameter of the window assembly.
Figure 13:
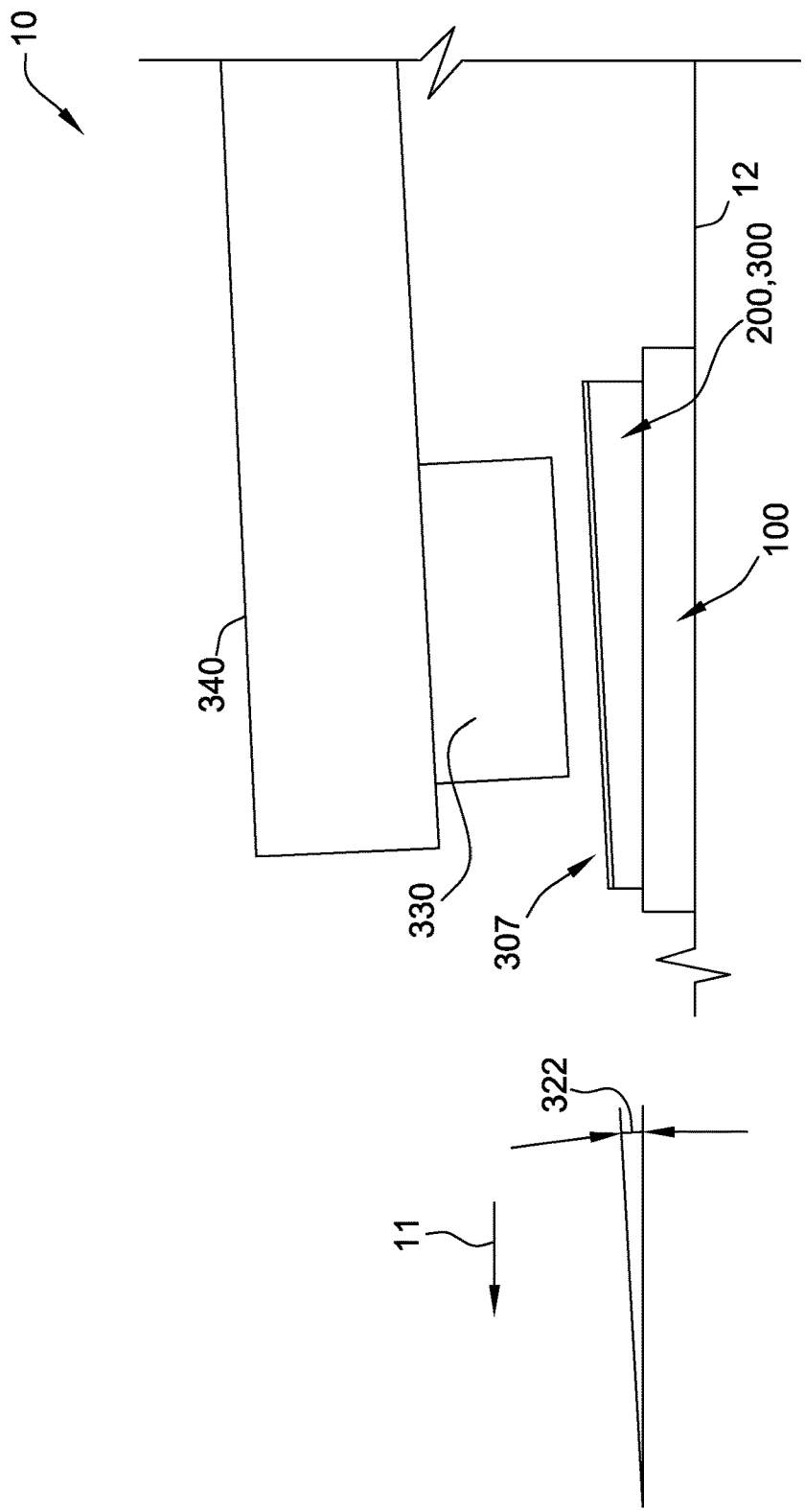
FIG. 13 is a schematic side elevation view of an interior of the aircraft shown in FIG. 3, with the window assembly shown in FIG. 9 installed in the receptacle shown in FIG. 3, and an embodiment of an imaging device installed adjacent the window assembly.

FIG. 12 is another cross-sectional view of the window assembly 300, taken across a full diameter of the window assembly 300. FIG. 13 is a schematic side elevation view of an interior of the aircraft 10 (shown in FIG. 3) with the window assembly 300 installed in the receptacle 100, and an embodiment of the imaging device 330 installed adjacent the window assembly 300. For example, the imaging device 330 is supported by a support structure 340 that is coupled to selected ones of the stringers 20 and/or ribs 22 (shown in FIG. 3).

Referring to FIGS. 9-13, in certain embodiments, the window assembly 300 is configured to position the window 302 at an oblique angle 322 relative to the payload assembly flanges 202, for example to position the window 302 at a corresponding desired angle with respect to the imaging device. For example, in the illustrated embodiment, the second end 307 of the housing 304 is sloped at the oblique angle 322 relative to the payload assembly flanges 202 to position the second face 303 of the window at the oblique angle 322. In the illustrated embodiment, with the window assembly 300 installed in the receptacle 100, the oblique angle 322 is disposed in a vertical plane with the forward direction 11 of the aircraft 10, such that the window 302 faces slightly towards the rear of the aircraft 10, as will be described in more detail below. The retainer ring 308 is configured to couple to the housing 304 at the same oblique angle 322 to support the first face 301 of the window at the oblique angle 322. The first end 305 of the housing of the window assembly is not angled relative to the payload assembly flanges 202, i.e., is level relative to the payload assembly flanges 202. This facilitates installation of the window assembly 300, as the flanges 202 of the window assembly 300 and the receptacle flanges 102 (shown in FIG. 4) are within a single plane, facilitating alignment of the flanges 202 of the window assembly 300 with the receptacle flanges 102. Furthermore, the window assembly 300 may be transported and/or stored resting on the first end 305 of the housing 304. In alternative embodiments, the second end 307 of the housing 304 and the retaining ring 308 are substantially parallel to the payload assembly flanges 202, such that the window 302 is received and positioned substantially parallel to the payload assembly flanges 202.

Also in the illustrated embodiment, a wall defining the housing 304 has a geometry that further accommodates receiving the disk-shaped window 302 at the oblique angle 322 relative to the payload assembly flanges 202, as described above. More specifically, the wall that defines the housing 304 has a varying thickness, such that some portions of the wall reduce in thickness from the first end 305 to the second end 307, while other portions of the wall increase in thickness from the first end 305 to the second end 307. For example, to form the wall geometry, the housing 304 is formed from a solid piece of material by boring the opening into which the window 302 is inserted at the oblique angle 322 relative to an outer surface 324 of the housing 304, resulting in the portions of the wall having varying thickness as described.

In certain embodiments, the window assembly 300 including the window 302 at the oblique angle 322 relative to the receptacle flanges 102, as installed, prevents distortion caused by the window 302. Additionally or alternatively, the oblique angle 322 aligned in a vertical plane with the forward direction 11 of the aircraft 10, as installed, allows the imaging device 330 to be angled downward and slightly rearward looking with respect to the aircraft 10, which may aid in capturing objects and/or terrain at the input of a pilot or passenger of the aircraft 10. Additionally or alternatively, the oblique angle 322 aligned in a vertical plane with the forward direction 11 of the aircraft 10, as installed, can facilitate offsetting an attitude at which the aircraft 10 travels relative to the ground. For example, in one embodiment, the aircraft 10 may travel with a four degree nose up angle at certain airspeeds. A four degree tilt of the imaging device 330 and a corresponding four degree oblique angle 322 offset the four degree angle of the aircraft 10, thereby positioning the imaging device 330 and window 302 level with the ground. This may increase the imaging accuracy of the imaging device 330.

Although the oblique angle 322 is illustrated as four degrees, in alternative embodiments, the window 302 and/or the imaging device 330 may be tilted at an angle other than four degrees, tilted at different angles relative to each other, tilted in a different direction (e.g., angled to view forward or to a side), or not tilted at all. For example, in some embodiments, the oblique angle 322 is between zero and twenty degrees. For another example, in some embodiments, the oblique angle 322 is between zero and six degrees. In some such embodiments, the second end 307 of the window assembly 300 has a corresponding angle relative to the payload assembly flanges 202. For example, the oblique angle 322 of the window 302 and/or the corresponding tilt of the imaging device 330 may be adjusted or changed to allow the aircraft 10 to perform varying imaging missions. For example, the aircraft 10 may be required to travel at different speeds during different imaging missions. In some such embodiments, a first window assembly 300 having the window 302 at a first oblique angle 322 may be replaced with a second window assembly 300 having the window 302 at a second oblique angle 322, using the installation and removal techniques described herein. Additionally or alternatively, the window 302 of a first window assembly 300 may become scratched or damaged, and first window assembly 300 may be replaced with a second window assembly 300 having an undamaged window 302, using the installation and removal techniques described herein. Embodiments of the systems and methods disclosed herein provide for more efficient installation, removal, and/or replacement of the window assembly 300.

In some embodiments in which the window 302 is at the oblique angle 322, the features of the receptacle flanges 102, the payload assembly flanges 202, the receptacle guides 120, the payload assembly guides 220, and/or the mechanical stop 130 that are configured to ensure installation of the payload assembly 200 within the receptacle 100 at the preselected rotational orientation, as described above with reference to FIGS. 4-6, serve to ensure that the window assembly 300 is installed in the receptacle 100 such that the oblique angle 322 is properly aligned with the forward direction 11 of the aircraft 10.

Figure 14:
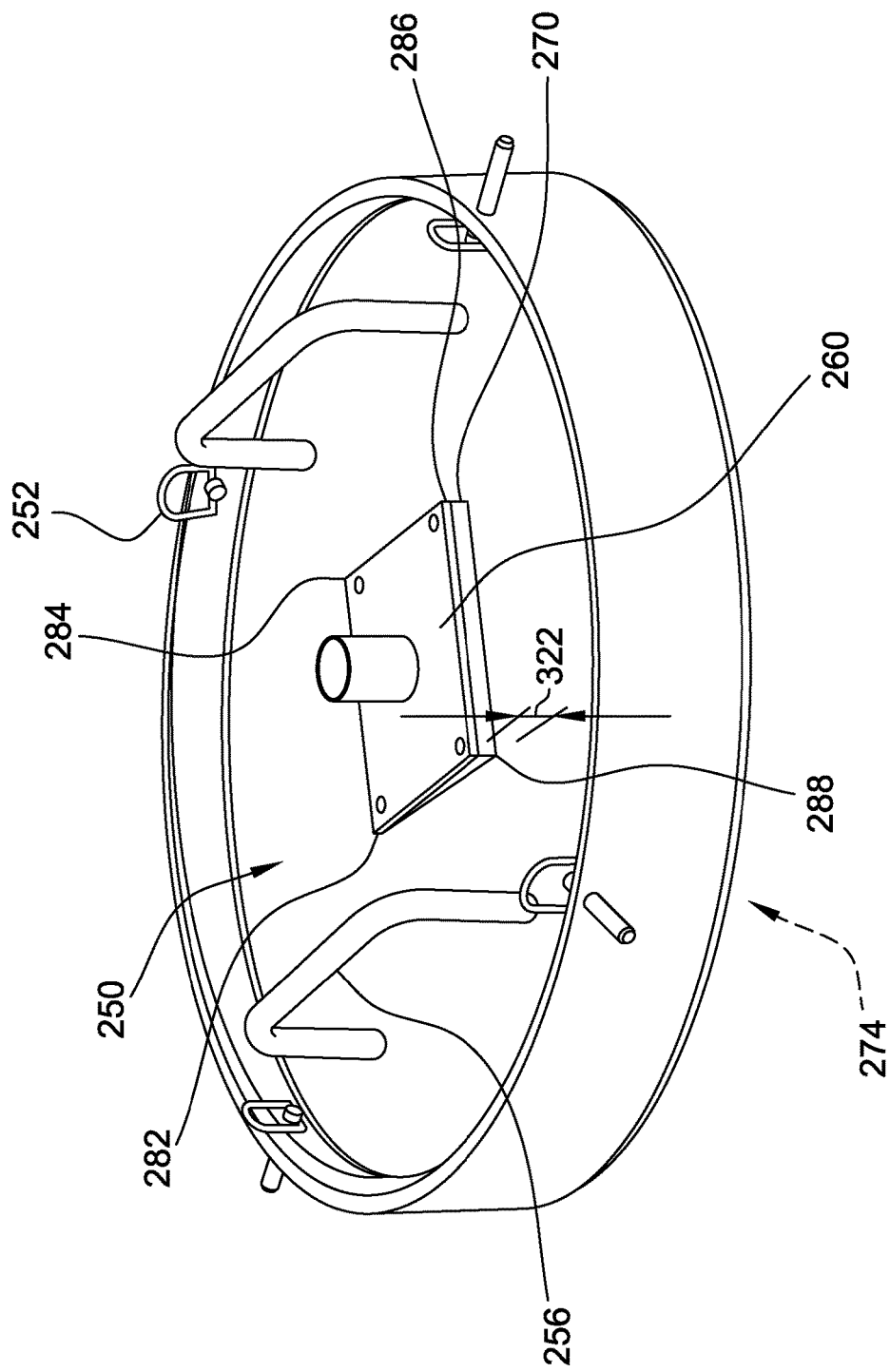
FIG. 14 is a perspective view of another embodiment of an installation tool for use with the window assembly shown in FIG. 9.

FIG. 14 is a perspective view of another embodiment of installation tool 250 for particular use with the window assembly 300 having the window 302 oriented at the oblique angle 322 relative to the payload assembly flanges 202 (shown in FIG. 12). In some embodiments, the installation tool 250 includes a shim 270 underneath the jack pad 260. The shim orients the jack pad 260 at the oblique angle 322 relative to the bottom surface 274 of the installation tool 250. Thus, when the jack pad 260 is coupled to a jack (not shown) operated from a level surface, the bottom surface 274 is oriented to couple flush against a bottom edge of the retainer ring 308 oriented at the oblique angle 322 to facilitate support of the window assembly 300 during installation and/or removal of the window assembly 300 within the receptacle 100 (shown in FIG. 13).

For example, in the illustrated embodiment, the shim 270 is a plate cut on a compound angle, such that the four corners of the shim 270 have differing thicknesses. More specifically, to orient the jack pad 260 at the oblique angle 322 of four degrees relative to the bottom surface 274, the first corner 282 has a thickness of 0.092 inches, the second corner 284 has a thickness of 0.050 inches, the third corner 286 has a thickness of 0.474 inches, the fourth corner 288 has a thickness of 0.517 inches, and each side of the shim 270 is 6 inches in length. In alternative embodiments in which the oblique angle 322 is other than four degrees, the shim 270 has correspondingly varying thicknesses to orient the jack pad 260 at the selected oblique angle 322 relative to the bottom surface 274.

In some embodiments, the shim 270 and the jack pad 260 are formed separately and coupled together. Alternatively, the shim 270 and the jack pad 260 are formed unitarily as a single component. The shim 270 and the jack pad 260 are coupled to the installation tool 250 in any suitable fashion, such as described above for the jack pad 260 with regard to FIG. 7.

Figure 15:
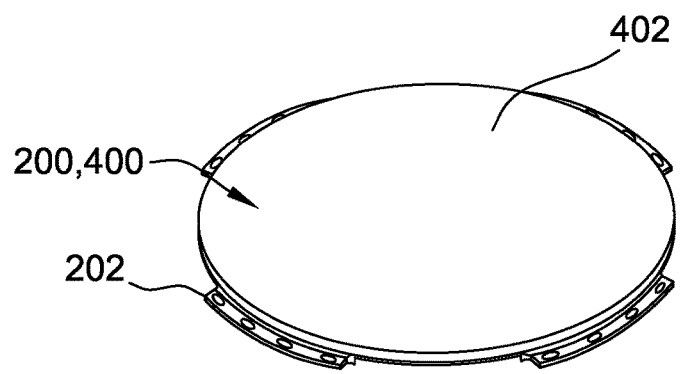
FIG. 15 is a perspective view of the payload assembly of FIG. 4 implemented as an embodiment of a plug.
Figure 16:
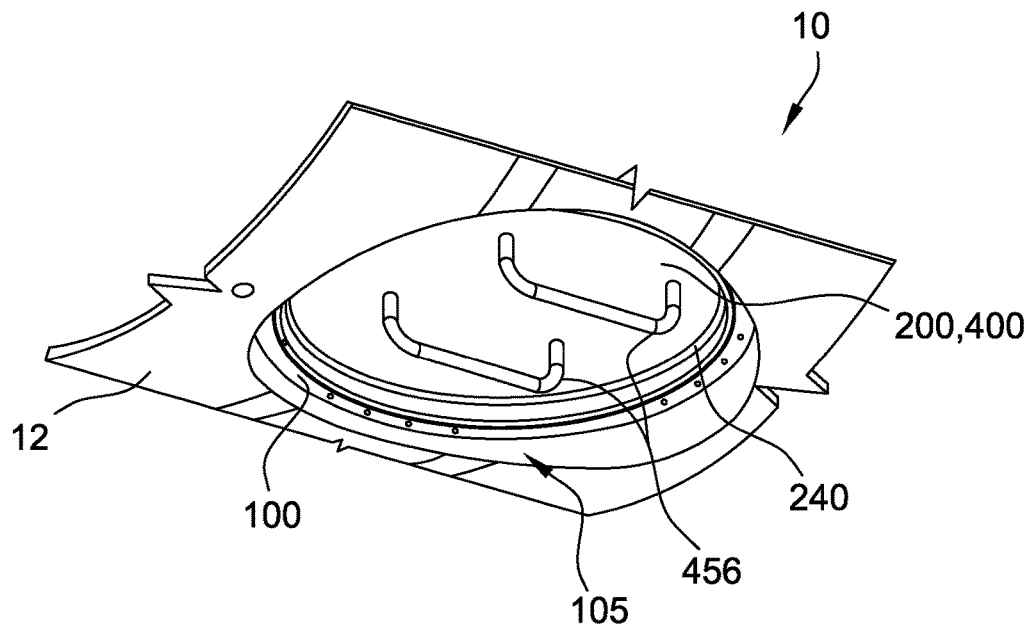
FIG. 16 is a perspective view of the plug shown in FIG. 15 installed in the receptacle of the aircraft shown in FIG. 3.

FIG. 15 is a perspective view of the payload assembly 200 implemented as an embodiment of a plug 400. FIG. 16 is a perspective view of the plug 400 installed in the receptacle 100 (shown in FIG. 3). Referring to FIGS. 15 and 16, in certain embodiments, the payload assembly 200 is a plug 400 configured for installation into the receptacle 100 to seal the opening 101 (shown in FIG. 3). More specifically, the plug 400 at least partially defines a pressure boundary between the interior of the aircraft 10 and the external environment. For example, the airplane 10 may be required to perform a mission that does not require an active payload assembly 200, and the plug 400 is installed in the receptacle 100, using the installation techniques described herein, to preserve the pressure boundary while reducing a weight of the aircraft 10 as compared to an active payload assembly 200.

The plug 400 includes a plate 402 configured to at least partially seal the opening 101 (shown in FIG. 3). In the illustrated embodiment, the plug 400 again includes the payload assembly flanges 202 which cooperate with the receptacle flanges 102 (shown in FIG. 4), as described above. Further in the illustrated embodiment, the plug 400 does not include guides 220 (shown in FIG. 5), as the plug is relatively easier to install and a rotational orientation of the plug with respect to the receptacle 100 does not affect any function of the plug. In alternative embodiments, the plug 400 includes guides 220.

In the illustrated embodiment, the payload assembly 200 embodied as the plug 400 again includes the pressure ring 240 to facilitate forming a seal between the exterior of the plug 400 and the interior of the receptacle 100, as described above. In alternative embodiments, any other suitable structure is used to enable the plug 400 to define a pressure boundary between the interior of the aircraft 10 and the external environment.

In certain embodiments, the plug 400 is installed and/or removed generally as described above for the payload assembly 200 with respect to FIGS. 4-6. In the illustrated embodiment, the plug 400 includes one or more handles 456 which function similarly to handles 256 of the installation tool 250 (shown in FIG. 7), as described above. The handles 456 facilitate installation and/or removal of the plug 400 in the receptacle 100 without the use of the installation tool 250. In some embodiments, the handles 456 are sized such that the handles 456 do not substantially extend below the bottom end 105 of the receptacle 100 when the plug is installed in the receptacle. This may limit drag or other aerodynamic forces caused by the handles 456. In alternative embodiments, rather than including handles 456, the plug 400 is configured for coupling to the installation tool 250 (shown in FIG. 7) and is installed and/or removed using the installation tool 250 in the same manner as described above.

With reference again to FIGS. 4 and 5, in alternative embodiments, the payload assembly 200 is any suitable payload for the aircraft 10. For example, but not by way of limitation, the payload assembly 200 is at least one of an atmospheric monitor, a sonobuoy, another suitable sensor, ordinance, a countermeasure, a collection device, and a dispersion device for dispersing materials into the atmosphere, such as liquid, aerosol or dry materials including fire retardant, silver iodide, and/or environmentally friendly defoliant. In some such embodiments, at least a portion of an interior of the aircraft 10 is pressurized, and the payload assembly 200 defines a pressure boundary between the interior of the aircraft 10 and the external environment. In certain embodiments, the payload assembly 200 may be adjusted or changed to allow the aircraft 10 to perform varying missions. For example, the aircraft 10 may be required to perform an imaging mission, followed by a dispersion mission, and a first payload assembly 200 that is a window assembly 300 may be replaced between missions with a second payload assembly 200 that is a suitable dispersion device, using the installation and removal techniques described herein. Embodiments of the systems and methods disclosed herein provide for more efficient installation, removal, and/or replacement of the payload assembly 200.

Figure 17:
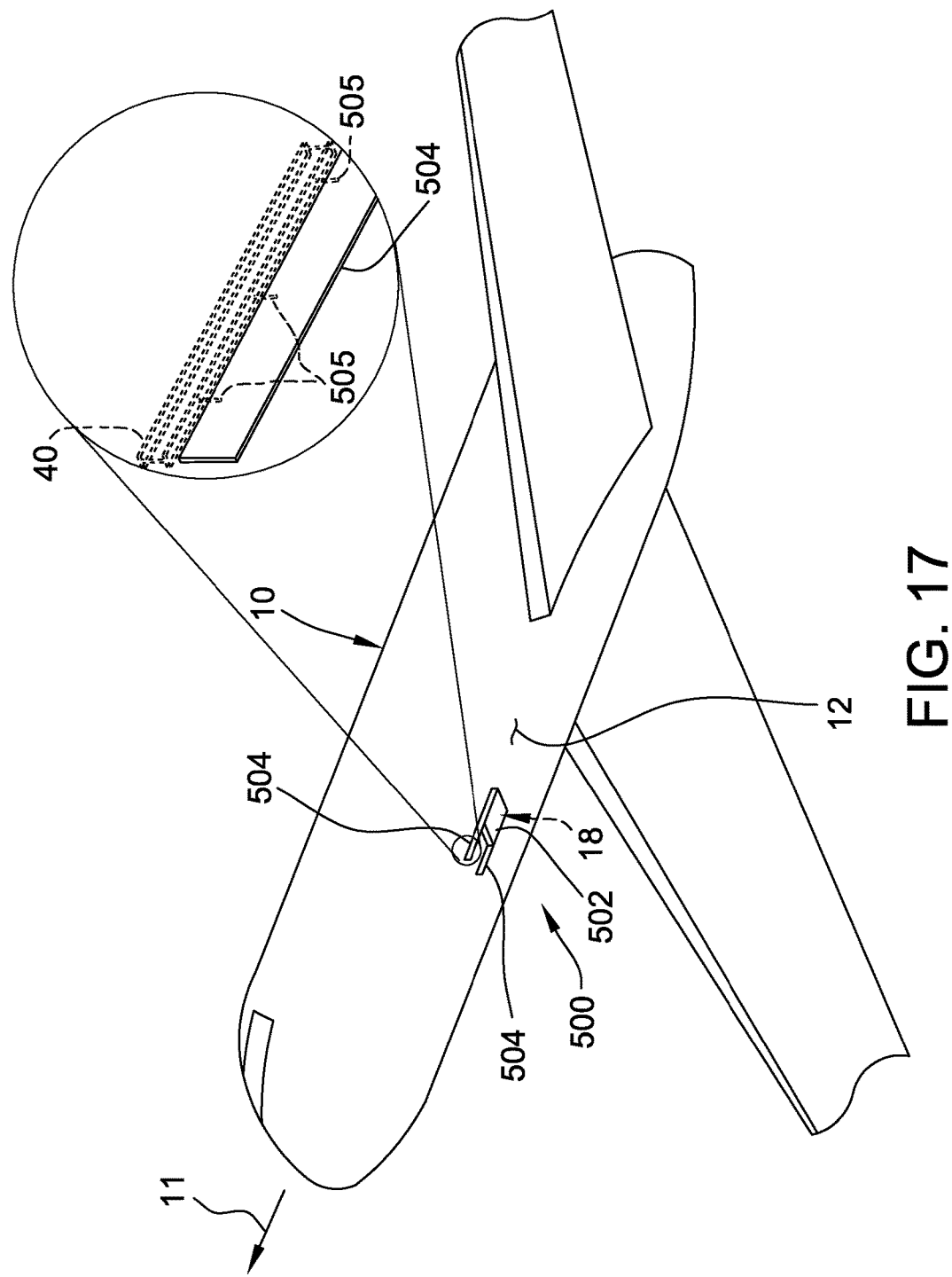
FIG. 17 is a perspective view of the aircraft shown in FIG. 3 including an embodiment of a door assembly mounted thereon.

FIG. 17 is a perspective view of an embodiment of the aircraft 10 including an embodiment of a door assembly 500 mounted thereon. The door assembly 500 includes a door 502 and at least one rail 504 configured to be mounted exteriorly to the aircraft outer skin 12. More specifically, the door 502 is connected or coupled to the at least one rail 504 for movement between a first position and a second position. In the illustrated embodiment, the rails 504 are configured to be generally parallel to the forward direction 11 of the aircraft 10, such that the door 502 is slidable parallel to the forward direction. In alternative embodiments, the rails 504 are disposed in any suitable direction with respect to the aircraft 10.

The port 18 is positioned with respect to the door assembly 500 such that the door 502 in a first position hides or conceals the port 18 from external view, and the door 502 in a second position reveals the port 18, thereby enabling access by the payload assembly 200 (shown in FIG. 4) to an exterior environment of the aircraft 10. For example, the door 502 is illustrated in the first position in FIG. 17, and the door 502 is movable in the forward direction 11 along the rails 504 to reach the second position. In alternative embodiments, the first and second positions are oriented in any suitable fashion with respect to the forward direction 11.

In certain embodiments, at least one rail 504 is aligned with, and coupled to, a corresponding interior member 40 (shown in FIG. 3) across the aircraft skin 12, such that the interior member 40 provides support for the exterior door assembly 500. For example, each rail 504 and corresponding interior member 40 are coupled together by suitable fasteners 505 extending through the aircraft outer skin 12. Moreover, in some such embodiments, the rails 504 cooperate with the interior members 40 to further enable the support structure 14 proximate the port 18 to route the load borne by the support structure around the break defined by the port, as discussed above. For example, the rails 504 span exteriorly from a continuous rib 22, across the at least one discontinuous rib 23 (shown in FIG. 3), and to another continuous rib 22, which in some embodiments at least partially compensates for the load bearing capability that is lost by removing, or by fabricating support structure 14 without, portions of the at least one discontinuous rib 23.

In certain embodiments, the door assembly 500 protects and/or conceals the payload assembly 200. The door 502 may be controlled or moved to the second or open position by a suitable control system (not shown) when required by the mission or payload operation. Thereafter, the door 502 can be controlled to move to its first or closed position. In the closed position, the payload assembly 200 is concealed. Moreover, in some embodiments, the door 502 itself is configured to be difficult to see or visualize.

The door operation may be controlled by a flight crew or, alternatively, remote operator controlled. Control may be based on factors including the type of payload assembly 200 installed and mission requirements. Control may also be automatic in some cases, such as automatic closure when the landing gear are extended for landing. The controlling function can be mechanized by different means electrically or mechanically, and may also include a mechanical backup such as a manual override mechanism in case of electrical motor failure.

In certain embodiments, the door assembly 500 mounted on an aircraft 10 as disclosed herein will accommodate operation of the aircraft in forward flight up to the limits of the aircraft ground and flight envelope, or through the ground or flight envelope of a rotorcraft including hover conditions, and in the case of a lighter than air vehicle throughout the flight envelope.

In some embodiments, the door assembly 500 is added to the aircraft 10 in a retrofit operation. In alternative embodiments, the door assembly 500 is included on the aircraft 10 as initially manufactured. In other alternative embodiments, the aircraft 10 does not include the door assembly 500. For example, the port 18 and/or the payload assembly 200 are not cloaked or hidden.

Embodiments of the systems and methods disclosed enable more efficient installation, removal, and/or replacement of a payload assembly within an aircraft. Such systems and methods facilitate rapid changing or swapping out a damaged payload assembly, as well as changing or swapping a type of payload assembly, such as a window for another type of component like a dispersion device. In some embodiments, the payload assembly at least partially defines a pressure boundary between an interior of the aircraft and an external environment. The systems and methods disclosed herein also provide for retrofitting, or alternatively initially manufacturing, an aircraft to include a port for the removable payload assembly, and a receptacle that receives the removable payload assembly and routes at least a portion of the load borne by the support structure of the aircraft around the break defined by the port. In some embodiments, the receptacle enables a relatively large portion of the support structure proximate the port to be removed to accommodate a larger payload assembly, without reducing the structural integrity of the aircraft.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An aircraft comprising:
   a support structure;
   an outer skin coupled to the support structure;
   a port that defines a break in the support structure and extends through the outer skin;
   a receptacle attached to portions of the support structure proximate the port, such that the receptacle routes at least a portion of the load borne by the support structure around the break defined by the port, the receptacle comprising an opening defined therein;
   a removable payload assembly mounted within the receptacle opening;
   a pressure ring forming a seal between an inner surface of the receptacle and an outer surface of the payload assembly;
   at least one interior member coupled to the receptacle, the at least one interior member aligned with, and fastened to, a corresponding at least one rail mounted exteriorly to the aircraft outer skin; and
   a door coupled to the at least one rail proximate the port for movement between a first position and a second position.

2. The aircraft of claim 1, wherein the receptacle is coupled to at least one of:

(i) a continuous stringer of a plurality of stringers of the support structure, and
(ii) a continuous rib of a plurality of ribs of the support structure,
wherein the at least one of the continuous stringer and the continuous rib extends past the port.

3. The aircraft of claim 1, wherein the receptacle comprises a housing shaped to be received in the port, the receptacle housing being integrally formed.

4. An aircraft comprising:
a support structure;
an outer skin coupled to the support structure;
a port that defines a break in the support structure and extends through the outer skin;
a receptacle attached to portions of the support structure proximate the port, such that the receptacle routes at least a portion of the load borne by the support structure around the break defined by the port, the receptacle comprising an opening defined therein;
a removable payload assembly mounted within the receptacle opening; and
a pressure ring forming a seal between an inner surface of the receptacle and an outer surface of the payload assembly, wherein:
the receptacle further comprises a plurality of circumferentially spaced receptacle flanges extending inwardly from an inner surface that defines the receptacle opening, and
the payload assembly further comprises a plurality of circumferentially spaced payload assembly flanges that extend outward from an outer surface of the payload assembly, each payload assembly flange is receivable through a corresponding gap defined between a pair of the receptacle flanges when the payload assembly is in a first rotational orientation with respect to the receptacle, and each payload assembly flange aligns for coupling with a corresponding receptacle flange when the payload assembly is in a second rotational orientation with respect to the receptacle.

5. The aircraft of claim 4, wherein the payload assembly at least partially defines a pressure boundary between an interior of the aircraft and an external environment.

6. An aircraft comprising:
a support structure;
an outer skin coupled to the support structure;
a port that defines a break in the support structure and extends through the outer skin;
a receptacle attached to portions of the support structure proximate the port, such that the receptacle routes at least a portion of the load borne by the support structure around the break defined by the port, the receptacle comprising an opening defined therein;
a removable payload assembly mounted within the receptacle opening, wherein the payload assembly comprises a window assembly, the window assembly comprising a window that is at least partially transparent to electromagnetic radiation in at least one bandwidth; and
a pressure ring forming a seal between an inner surface of the receptacle and an outer surface of the payload assembly, wherein:
the payload assembly further comprises a plurality of circumferentially spaced payload assembly flanges that extend outward from an outer surface of the payload assembly and are coupled to the receptacle, and
the window assembly is configured to position the window at an oblique angle relative to the payload assembly flanges.

7. The aircraft of claim 6, further comprising an imaging device positioned adjacent to the window.

8. A method of retrofitting an aircraft to accommodate a removable payload assembly, the aircraft including a support structure and an outer skin coupled thereto, the method comprising:
removing a portion of the support structure adjacent a port such that a break in the support structure is defined, wherein the port extends through the outer skin;
coupling a receptacle to portions of the support structure proximate the port, such that the receptacle routes at least a portion of the load borne by the support structure around the break defined by the port, the receptacle including an opening defined therein;
coupling a removable payload assembly within the receptacle opening; and
coupling a pressure ring between an inner surface of the receptacle and an outer surface of the payload assembly, the pressure ring configured to form a seal therebetween.

9. The method of claim 8, further comprising coupling the receptacle to at least one of:
(i) a continuous stringer of a plurality of stringers of the support structure, and
(ii) a continuous rib of a plurality of ribs of the support structure,
wherein the at least one of the continuous stringer and the continuous rib extends past the port.

10. The method of claim 8, further comprising:
coupling at least one interior member to the receptacle, the at least one interior member aligned with, and fastened to, a corresponding at least one rail mounted exteriorly to the aircraft outer skin; and
coupling a door to the at least one rail proximate the port for movement between a first position and a second position.

11. The method of claim 8, wherein coupling the receptacle to the portions of the support structure comprises coupling an integrally formed housing of the receptacle to the portions of the support structure, the housing shaped to be received in the port.

12. The method of claim 8, wherein coupling the removable payload assembly within the receptacle opening comprises:
positioning the payload assembly in a first rotational orientation with respect to the receptacle opening, such that each of a plurality of flanges of the payload assembly aligns with a corresponding gap defined between a pair of a plurality of flanges of the receptacle, wherein the receptacle flanges extend inwardly from an inner surface that defines the receptacle opening and the payload assembly flanges extend outward from an outer surface of the payload assembly;
moving the payload assembly at least partially into the receptacle opening, such that the payload assembly flanges pass through the corresponding gaps;
rotating the payload assembly to a second rotational orientation, such that each receptacle flange is aligned with a corresponding payload assembly flange; and
coupling each receptacle flange to the corresponding payload assembly flange to secure the payload assembly within the receptacle.

13. The method of claim 12, wherein coupling the removable payload assembly within the receptacle opening further comprises coupling the payload assembly such that the payload assembly at least partially defines a pressure boundary between an interior of the aircraft and an external environment.

14. The method of claim 8, wherein coupling the removable payload assembly within the receptacle opening comprises coupling the payload assembly that includes a window assembly, the window assembly comprising a window that is at least partially transparent to electromagnetic radiation in at least one bandwidth.

15. The method of claim 14, further comprising positioning an imaging device adjacent to the window.

16. The method of claim 14, wherein the payload assembly further includes a plurality of circumferentially spaced payload assembly flanges that extend outward from an outer surface of the payload assembly, and wherein coupling the removable payload assembly within the receptacle opening comprises coupling the payload assembly flanges to the receptacle such that the window is positioned at an oblique angle relative to the payload assembly flanges.

17. A method of installing a removable payload assembly in a receptacle of an aircraft, the aircraft including a support structure, an outer skin coupled to the support structure, and a port extending through the outer skin, wherein the receptacle is coupled to portions of the support structure proximate the port, the method comprising:
positioning the payload assembly in a first rotational orientation with respect to an opening defined in the receptacle, such that each of a plurality of flanges of the payload assembly aligns with a corresponding gap defined between a pair of a plurality of flanges of the receptacle, wherein the receptacle flanges extend inwardly from an inner surface that defines the receptacle opening and the payload assembly flanges extend outward from an outer surface of the payload assembly;
moving the payload assembly at least partially into the receptacle opening, such that the payload assembly flanges pass through the corresponding gaps;
rotating the payload assembly to a second rotational orientation, such that each receptacle flange is aligned with a corresponding payload assembly flange; and
coupling each receptacle flange to the corresponding payload assembly flange to secure the payload assembly within the receptacle.

18. The method of claim 17, further comprising coupling a pressure ring between the inner surface of the receptacle and the outer surface of the payload assembly, the pressure ring configured to form a seal therebetween.

19. The method of claim 17, wherein positioning the payload assembly in the first rotational orientation comprises positioning the payload assembly that includes a window assembly, the window assembly comprising a window that is at least partially transparent to electromagnetic radiation in at least one bandwidth.

20. The method of claim 19, wherein coupling together the receptacle flanges and the corresponding payload assembly flanges comprises coupling together the flanges such that the window is positioned at an oblique angle relative to the payload assembly flanges.

* * * * *